(12) United States Patent
Yono et al.

(10) Patent No.: US 7,960,300 B2
(45) Date of Patent: Jun. 14, 2011

(54) TITANIUM-CONTAINING OXIDE GLASS AND METHOD FOR PRODUCTION THEREOF

(75) Inventors: Kentei Yono, Ibaraki (JP); Yasutomo Arai, Ibaraki (JP); Atsunobu Masuno, Ibaraki (JP); Takehiko Ishikawa, Ibaraki (JP); Shinichi Yoda, Ibaraki (JP)

(73) Assignee: Japan Aerospace Exploration Agency, Tokyo (JP)

( * ) Notice: Subject to any disclaimer, the term of this patent is extended or adjusted under 35 U.S.C. 154(b) by 172 days.

(21) Appl. No.: 12/310,944

(22) PCT Filed: Sep. 13, 2007

(86) PCT No.: PCT/JP2007/067854
§ 371 (c)(1),
(2), (4) Date: Mar. 12, 2009

(87) PCT Pub. No.: WO2008/032789
PCT Pub. Date: Mar. 20, 2008

(65) Prior Publication Data
US 2010/0003514 A1    Jan. 7, 2010

(30) Foreign Application Priority Data

Sep. 14, 2006  (JP) .................................. 2006-250111

(51) Int. Cl.
*C03C 12/00*      (2006.01)
*C03C 12/02*      (2006.01)

(52) U.S. Cl. ............ 501/33; 501/34; 501/41; 106/31.04

(58) Field of Classification Search .................... 601/33, 601/34, 134, 135, 136, 137, 41
See application file for complete search history.

(56) References Cited

U.S. PATENT DOCUMENTS 3,293,051 A    12/1966  Searight et al.
(Continued)

FOREIGN PATENT DOCUMENTS

CN    86106629    4/1988
(Continued)

OTHER PUBLICATIONS

Terai, R., "Precision Molding Technology of Low-Melting and Free-Lead Glass Outlined from Recent Japanese Patents (2)", Materials Integration, vol. 18, No. 10, 2005, pp. 58-66. Partial English translation.

*Primary Examiner* — Karl E Group
(74) *Attorney, Agent, or Firm* — Hamre, Schumann, Mueller & Larson, P.C.

(57) ABSTRACT

A titanium-containing oxide glass having a bulky form and substantially having a chemical composition represented by the formula: $(M1)_{1-x}(M2)_x(Ti_{1-y1}(M3)_{y1})_{y2}O_z$ [wherein M1 represents an element selected from Ba, La, Ce, Pr, Nd, Sm, Eu, Gd, Tb, Dy, Ho, Er, Tm, Yb, Lu, Na and Ca; M2 represents at least one element selected from Mg, Ba, Ca, Sr, La, Ce, Pr, Nd, Sm, Eu, Gd, Tb, Dy, Ho, Er, Tm, Yb, Lu, Na, Sc, Y, Hf, Bi and Ag; M3 represents at least one element selected from V, Cr, Mn, Fe, Co, Ni, Cu, Zn, Zr, Nb, Mo, Ru, Rh, Pd, Al, Si, P, Ga, Ge, In, Sn, Sb and Te; and x, y1, y2 and z satisfy the following requirements: $0 \leq x \leq 0.5$, $0 \leq y1 < 0.31$, $1.4 < y2 < 3.3$, and $3.9 < z < 8.0$, provided that $x+y1 \neq 0$ when M1 represents Ba, and $y1 \neq 0$ when both M1 and M2 represent Ba].

8 Claims, 27 Drawing Sheets

U.S. PATENT DOCUMENTS

| | | | | |
|---|---|---|---|---|
| 4,082,427 A | * | 4/1978 | Nakashima | 359/540 |
| 4,141,742 A | * | 2/1979 | Nakajima | 501/73 |
| 7,513,941 B2 | * | 4/2009 | Frey et al. | 106/31.04 |
| 7,579,293 B2 | * | 8/2009 | Frey et al. | 501/34 |
| 7,745,360 B2 | * | 6/2010 | Frey et al. | 501/34 |
| 2005/0199180 A1 | | 9/2005 | Yono et al. | |
| 2006/0205095 A1 | | 9/2006 | Yono et al. | |
| 2007/0110960 A1 | * | 5/2007 | Frey et al. | 428/143 |

FOREIGN PATENT DOCUMENTS

| | | |
|---|---|---|
| GB | 1 233 512 A | 5/1971 |
| JP | 42-022385 B1 | 11/1967 |
| JP | 47-008317 B1 | 3/1972 |
| JP | 54031415 * | 3/1979 |
| JP | 54040814 * | 3/1979 |
| JP | 59-164650 A | 9/1984 |
| JP | 2001-048586 A | 2/2001 |
| JP | 2004-083344 A | 3/2004 |
| JP | 2005-053726 A | 3/2005 |
| JP | 2005-104768 A | 4/2005 |
| JP | 2005-213083 A | 8/2005 |
| JP | 2006-248801 A | 9/2006 |
| WO | WO 2005/061403 A1 | 7/2005 |

* cited by examiner $SmTi_{2.25}O_6$ $CeTi_{2.25}O_{6.5}$ $PrTi_{2.25}O_{6.3}$

TITANIUM-CONTAINING OXIDE GLASS AND METHOD FOR PRODUCTION THEREOF

TECHNICAL FIELD

The present invention relates to a titanium-containing oxide glass, and a method for production thereof, and particularly to a titanium-containing oxide glass having a high refractive index, and a method for production thereof.

BACKGROUND ART

The properties of a glass material can be varied in desirable ways by appropriately selecting the components of the glass composition, and by varying the proportion of each component. For this reason, glass materials have been used in many different applications including electronics and optics.

However, depending on the composition, the material undergoes crystal precipitation or phase separation, which makes it difficult to vitrify the material uniformly. Further, some components do not melt even under high temperature, and remain as an unmelted solid. That is, there are many compositions that are difficult to vitrify with the use of a common method in which a batch of raw material is placed in a ceramic or platinum crucible and melted in a high-temperature furnace. Many other compositions are only usable to produce a powder or a flaky glass, and cannot produce a mass or a bulk glass more voluminous than a powder or a flaky glass. For example, titanium oxide ($TiO_2$), known as a high refractive-index glass material (see, for example, *Precision Molding Technology of Low-Melting and Free-lead Glass Outlined from Recent Japanese Patents* (2), Materials Integration, Vol. 18, No. 10, (2005), p. 58-66), is expected to find applications in the field of optics. However, because titanium oxide easily crystallizes, it has been difficult to produce a bulk glass using titanium oxide as a main material. Attempts have been made to obtain glass by rapidly roller quenching a melt prepared from a mixture of titanium oxide and lanthanum oxide ($La_2O_3$). However, this method is only capable of producing a laminar glass, not a bulk glass.

There have been proposed methods of producing a single crystal piece or a ceramic of barium-titanium oxide, in which the barium-titanium oxide is melted and solidified in the levitation state (levitation method; see JP2005-53726A, and JP2005-213083A).

DISCLOSURE OF THE INVENTION

An object of the present invention is to provide a titanium-containing oxide glass of a bulk form, which is not available conventionally, and is expected to have a high refractive index. The invention also provides a method for producing such a titanium-containing oxide glass of a bulk form.

A titanium-containing oxide glass of the present invention is of a bulk form, and essentially has a composition represented by the formula $(M1)_{1-x}(M2)_x(Ti_{1-y1}(M3)_{y1})_{y2}O_z$. M1 is one element selected from Ba, La, Ce, Pr, Nd, Sm, Eu, Gd, Tb, Dy, Ho, Er, Tm, Yb, Lu, Na, and Ca. M2 is at least one element selected from Mg, Ba, Ca, Sr, La, Ce, Pr, Nd, Sm, Eu, Gd, Th, Dy, Ho, Er, Tm, Yb, Lu, Na, Sc, Y, Hf, Bi, and Ag. M3 is at least one element selected from V, Cr, Mn, Fe, Co, Ni, Cu, Zn, Zr, Nb, Mo, Ru, Rh, Pd, Al, Si, P, Ga, Ge, In, Sn, Sb, and Te. The symbols x, y1, y2, and Z satisfy:

$0 \leq x \leq 0.5$, $0 \leq y1 < 0.31$, $1.4 < y2 < 3.3$, $3.9 < z < 8.0$, $x + y1 \neq 0$ when M1 is Ba, and $y1 \neq 0$ when M1 and M2 are Ba.

As used herein, a "glass" refers to a substance that exhibits a glass transition point (Tg) in a measurement such as DTA. Further, as used herein, the term "essentially" means that the titanium-containing oxide glass may include no more than 1 mol %, preferably no more than 0.5 mol %, and more preferably no more than 0.1 mol % of impurities.

A titanium-containing oxide glass of the present invention contains titanium oxide, making it possible to increase its refractive index. Further, because a titanium-containing oxide glass of the present invention is of a bulk form and has a high transmittance for visible light, it can be used suitably as a material of, for example, optical parts such as a lens.

A producing method of a titanium-containing oxide glass of the present invention is a method for producing a titanium-containing oxide glass of the present invention. The method includes:

(a) heating and melting a raw material adjusted to have a predetermined composition, with the raw material being levitated in air; and (b) cooling the raw material after melting.

In the descriptions below, the term "levitation method" is used to refer to the method in which a raw material is melted in a levitation state in air.

In a producing method of a titanium-containing oxide glass of the present invention, a raw material is melted without making contact with a container such as a crucible, prior to cooling. This makes it possible to vitrify even compositions containing large amounts of titanium oxide, which generally is believed to cause difficulties in vitrification. For example, vitrification is difficult in compositions containing materials that easily crystallize. In such compositions, crystal precipitation often occurs in areas of contact between the container and the glass material being melted. On the other hand, in a method of the present invention, the raw material is melted and cooled without making contact with the container, inhibiting crystal precipitation of the titanium oxide. This enables production of a titanium-containing oxide glass of a bulk form. Further, with a method of the present invention, the titanium-containing oxide glass can be conveniently produced in a short time period.

BEST MODE FOR CARRYING OUT THE INVENTION

Figure 1:
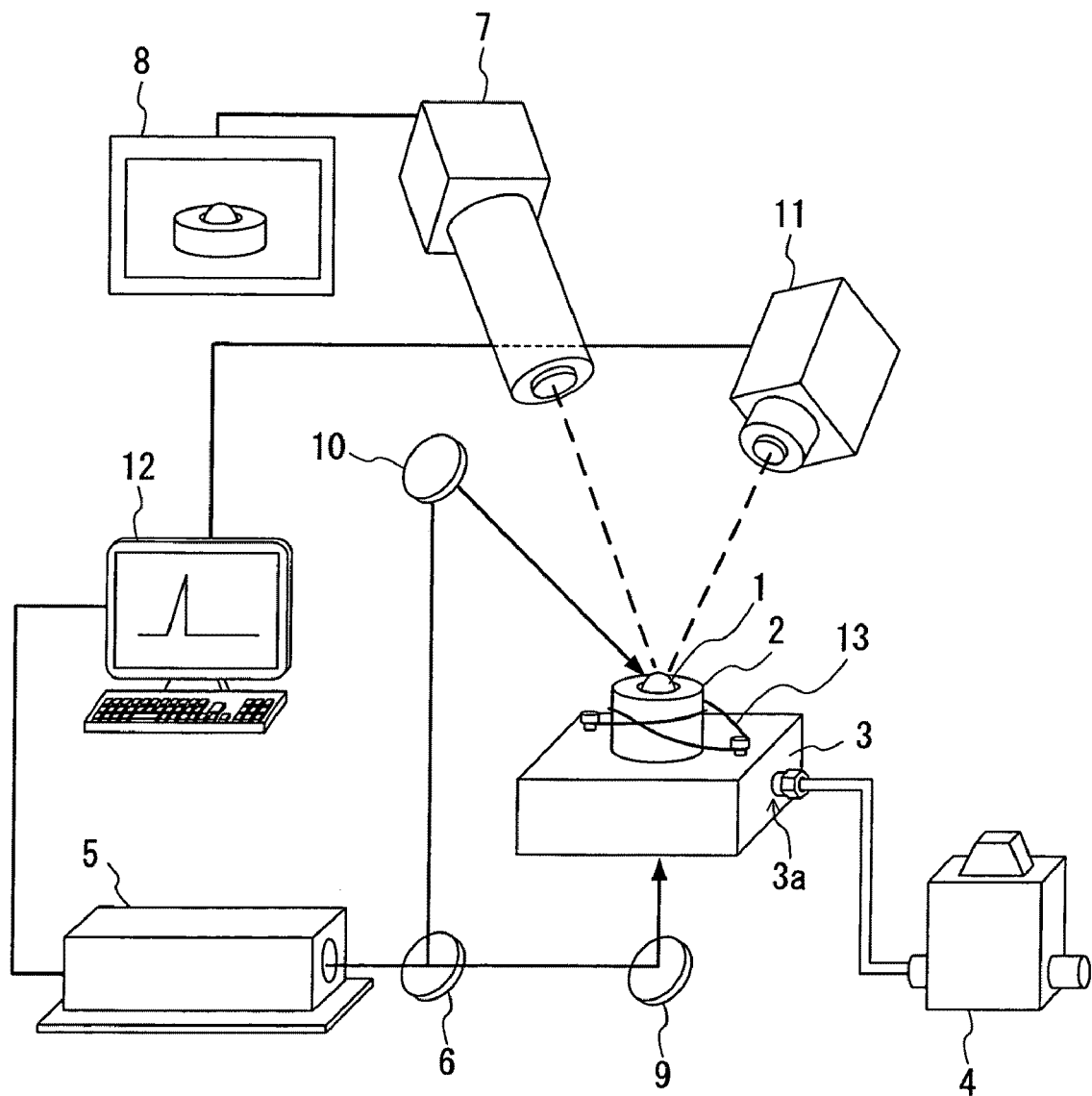
FIG. 1 is a diagram schematically illustrating an example of a gas levitation apparatus used in a producing method of a titanium-containing oxide glass of the present invention.

The following will describe an embodiment of the present invention.

(Titanium-Containing Oxide Glass)

A titanium-containing oxide glass of the present invention has a composition represented by the formula $(M1)_{1-x}(M2)_x(Ti_{1-y1}(M3)_{y1})_{y2}O_z$. As noted above, M1 is one element selected from Ba, La, Ce, Pr, Nd, Sm, Eu, Gd, Tb, Dy, Ho, Er, Tm, Yb, Lu, Na, and Ca. M2 is at least one element selected from Mg, Ba, Ca, Sr, La, Ce, Pr, Nd, Sm, Eu, Gd, Tb, Dy, Ho, Er, Tm, Yb, Lu, Na, Sc, Y, Hf, Bi, and Ag. M3 is at least one element selected from V, Cr, Mn, Fe, Co, Ni, Cu, Zn, Zr, Nb, Mo, Ru, Rh, Pd, Al, Si, P, Ga, Ge, In, Sn, Sb, and Te. Further, x, y1, y2, and Z satisfy:

$$0 \leq x \leq 0.5,$$

$$0 \leq y1 < 0.31,$$

$$1.4 < y2 < 3.3,$$

$$3.9 < z < 8.0,$$

$$x + y1 \neq 0 \text{ when M1 is Ba, and}$$

$$y1 \neq 0 \text{ when M1 and M2 are Ba.}$$

M1 may be one element selected from, for example, Ba, La, Ce, Pr, Nd, Sm, and Ca, or one element selected from La, Ce, Pr, Nd, and Sm. Further, M1 may be one element selected from Ba, La, Nd, and Ca, or one element selected from Ba, La, and Nd.

The value of y1 indicating the content of the element (M3) substituting Ti may be, for example, 0.1 or less, or 0.05 or less.

In order to realize a high refractive index, it is desirable that the main component $TiO_2$ of a titanium-containing oxide glass of the present invention be partly substituted with oxides having a higher refractive index than $TiO_2$ (refractive index nd=2.0; see *Hajimete garasu wo tsukuru hitono tameni*, Masayuki Yamane, Uchida Rokakuho Publishing Co., Ltd., 1989, p. 91, Table 5.6 (referred to as "Reference" hereinafter)). Examples of such oxides include $ZrO_2$ (refractive index nd=2.2 (see Reference)), and $Bi_2O_3$ (refractive index nd=3.2 (see Reference)). Thus, in order to realize a high refractive index, it is preferable that the value of y1 indicating the content of the Ti-substituting element (M3) be 0.05 or more, and more preferably 0.25 or more.

On the other hand, vitrification may become difficult when the content of Ti (including the content of the Ti-substituting element (M3)), i.e., the value of y2, is too large. It is therefore preferable that the value of y2 be 3 or less.

From a different aspect, in terms of the oxide content, a titanium-containing oxide glass of the present invention may contain titanium oxide ($TiO_2$) in the amount of, for example, 57 mol % or more, or 80 mol % or more. In this case, the remaining part of the titanium-containing oxide-glass of the present invention is essentially the oxide of the non-Ti elements M1, M2, and M3. Note that in the case where the remaining part is essentially La($La_2O_3$), vitrification is possible even when the titanium oxide content is 80 mol % or more, or even 85 mol %.

For example, when M1 is Ba, or more specifically, when a titanium-containing oxide glass of the present invention has the formula $Ba_{1-x}(M2)_x(Ti_{1-y1}(M3)_{y1})_{y2}O_z$, the symbols x, y1, y2, and z may satisfy:

$0 \leq x \leq 0.5$, $0 \leq y1 < 0.05$, $1.4 < y2 < 2.3$, $3.9 < z < 6.5$, $x+y1 \neq 0$, and $y1 \neq 0$ when M2 is Ba.

Further, when M1 is Ba, and when M2, substituting Ba, is at least one element selected from La, Ce, Pr, Nd, Sm, Eu, Gd, Tb, Dy, Ho, Er, Tm, Yb, and Lu, the symbols x, y1, y2, and z may satisfy:

$0 \leq x \leq 0.5$, $0 \leq y1 < 0.05$, $1.4 < y2 < 2.3$, $3.9 < z < 6.5$, and $x+y1 \neq 0$.

Further, when M1 is, for example, La, it is preferable to use Zr as the element (M3) substituting Ti, because Zr is a heavy element, similar in chemical properties to Ti.

A titanium-containing oxide glass of the present invention preferably has a refractive index of 2.0 or more, and more preferably 2.1 or more in the visible light range (a wavelength range of about 380 nm to 780 nm). Further, a titanium-containing oxide glass of the present invention may be a glass having desirable transparency for visible light rays. A titanium-containing oxide glass of the present invention is a bulk, not a powder or any other conventional form. The present invention, which provides a bulk glass having a high refractive index and desirable transparency for visible light rays, is therefore applicable to a wide range of optical parts. As used herein, the meaning of the term "bulk" excludes forms such as a flake or a powder, and the term refers to forms whose minimum dimension (the smallest dimension passing the center of gravity) is 10 μm or more (preferably 50 μm or more).

For example, when producing a titanium-containing oxide glass of the present invention by a levitation method below, a raw material melt solidifies into a sphere by its surface tension during the cooling process. That is, with a method of the present invention, it is possible to obtain a titanium-containing oxide glass of a spherical form, and a spherical glass having a minimum diameter or 0.5 mm or more, or 1 mm or more. Further, depending on the intended use, a spherical glass having a minimum diameter of 5 cm or less may be produced. It is therefore possible to use a titanium-containing oxide glass of the present invention for optical parts, such as, for example, a spherical lens, without requiring any processing for making the glass or glass surface spherical.

(Production Method of Titanium-Containing Oxide Glass)
<Levitation Apparatus>

FIG. 1 is a diagram showing a schematic illustration of one example of an apparatus (levitation apparatus) used to perform a levitation method in a producing method of a titanium-containing oxide glass of the present invention.

The levitation apparatus includes: a gas levitation furnace 2, provided to levitate a raw material 1 in air; an anchorage 3, provided to prevent movement of the gas levitation furnace 2, and supply a levitation gas to the gas levitation furnace 2; a flow-rate adjuster 4, provided to adjust the flow rate of the gas supplied to the anchorage 3; a carbon dioxide laser 5, which emits a laser beam to heat the levitating, raw material 1; a beam splitter 6, which splits the laser beam from the laser 5 into two beams; an imaging unit (here, a CCD camera) 7 and a monitor 8 to monitor the levitation state of the raw material 1; a radiation thermometer 11 to measure a temperature of the raw material 1; and a control unit 12 to control the laser output and other parameters of the laser 5.

The gas levitation furnace 2 includes a gas supply channel (not shown) through which the levitation gas for the raw material 1 flows upward (against the direction of the gravitational force). The gas is supplied into the gas supply channel through a nozzle (not shown) provided underneath (at the bottom of the furnace). The gas levitation furnace 2 levitates the raw material 1 in air by the pressure of the flowing gas. The flow rate of the flowing gas is related to such factors as the mass of the raw material, and is not particularly limited. For example, when the levitating raw material is 0.005 g to 0.05 g, the gas may flow at a rate of, for example, 0.1 L/min to 0.5 L/min. The gas levitation furnace 2 is anchored to the anchorage 3 with an anchoring wire 13. The anchorage 3 has a gas supply port 3a. The flow-rate adjuster 4 is connected to the gas supply port 3a of the anchorage 3, and controls the flow rate of the gas supplied into the gas levitation furnace 2. The gas flow rate may be adjusted according to the levitation state of the raw material 1, by monitoring it with the imaging unit 7 and the monitor 8. The raw material 1 is heated to a predetermined temperature in the levitated state. For the heating, a laser beam is used. The laser beam emitted by the carbon dioxide laser 5 is split into two laser beams of substantially equal power by the beam splitter 6. These laser beams respectively are reflected by reflecting mirrors 9 and 10 onto the raw material 1 from above and below. The temperature of the raw material 1 is measured by the radiation thermometer 11 in a non-contact manner. The temperature information measured by the radiation thermometer 11 is sent to the control unit 12, which then reads the temperature information, and, according to a predetermined control program, controls the laser output providing heat for the raw material 1, thereby controlling the temperature of the raw material 1.

<Producing Method of Glass Using Levitation Method>

The following describes a method for producing a glass using the levitation apparatus shown in FIG. 1.

First, the raw material 1 is set in the gas levitation furnace 2, and gas flows into the gas levitation furnace 2 to levitate the raw material 1. The levitation gas may be, for example, air, Ar, or $N_2$.

Next, the control unit 12 adjusts the laser output of the carbon dioxide laser 5, which then emits a laser beam to heat the raw material 1. While measuring the temperature of the raw material 1 with the radiation thermometer 11, the raw material 1 is heated to at least its melting point, taking into account the evaporation and the complete fusion of the raw material 1. The heating temperature is not particularly limited, as long as it is equal to or greater than the melting point of the raw material 1. For example, temperatures 100° C. to 500° C. above the melting point of the raw material 1 are preferable.

The levitation state and the melting state of the raw material 1 are monitored on the monitor 8, by observing the image captured by the imaging unit 7. Based on this observation, the gas flow rate and the heating temperature are adjusted to levitate the raw material melt stably. Here, in order to remove bubbles formed in the raw material melt, it is preferable to maintain the raw material at a predetermined temperature for a predetermined time period (several minutes), after the raw material has melted completely. The predetermined temperature to maintain the molten raw material is not particularly limited, and it may be, for example, a temperature 100° C. to 500° C. above the melting point. The time to maintain the molten state is not particularly limited either, and it may be, for example, 0.5 to 5 minutes.

Next, the raw material melt is cooled at a predetermined rate, by adjusting the output of the laser beam hitting the raw material 1, or by turning off the laser beam. This causes the raw material melt to solidify without undergoing crystallization, thereby obtaining a glass. For example, the cooling rate is preferably 500° C./sec to 1,000° C./sec, and more preferably 1,000° C./sec to 1,500° C./sec.

<Glass Raw Material>

A glass raw material used in a producing method of the present invention is prepared in such a manner that the product glass has a composition represented by the formula $(M1)_{1-x}(M2)_x(Ti_{1-y1}(M3)_{y1})_{y2}O_z$. Note that the elements indicated by M1, M2, and M3, and the requirements for x, y1, y2, and z areas described above in conjunction with a titanium-containing oxide of the present invention.

The following describes an example of a method for preparing a glass raw material used in a producing method of the present invention.

First, in order to prepare a glass raw material that can form a titanium-containing oxide glass of a desired composition (a predetermined composition represented by $(M1)_{1-x}(M2)_x(Ti_{1-y1}(M3)_{y1})_{y2}O_z$), raw material powders such as oxide powders are weighed and mixed at a desired weight ratio. For example, when preparing 1 g of a glass raw material of the composition $Ba_{0.7}Er_{0.3}Ti_2O_{5.15}$, 0.43183 g of a $BaCO_3$ powder, 0.16503 g of an $Er_2O_3$ powder, and 0.49932 g of a $TiO_2$ powder are weighed out. After being weighed, the raw material powders are wet-blended using ethanol (first wet-blending), followed by pre-firing. Specifically, for example, a dried powder blend is placed in an electric furnace, and the powders are pre-fired at, for example, 1,000° C. for 12 hours to sinter the powder blend. After pre-firing, the powders are wet-blended again (second wet-blending), and the blend is press-molded into, for example, a rod shape. Then, the molded product is cut out to obtain a solid of a predetermined size, which is then final-fired at, for example, 1,250° C. for 12 hours to obtain a glass raw material.

The preparation of a glass raw material proceeds in the manner described above. The method for preparing a glass raw material described above is merely an example, and the size of the raw material, and the temperature and the time of pre-firing and final-firing are not limited to the foregoing examples.

(Examples of Optical Parts Using a Titanium-Containing Oxide Glass of the Present Invention)

The following describes specific examples of optical parts using a titanium-containing oxide glass of the present invention.

<Coupling Lens>

Figure 2:
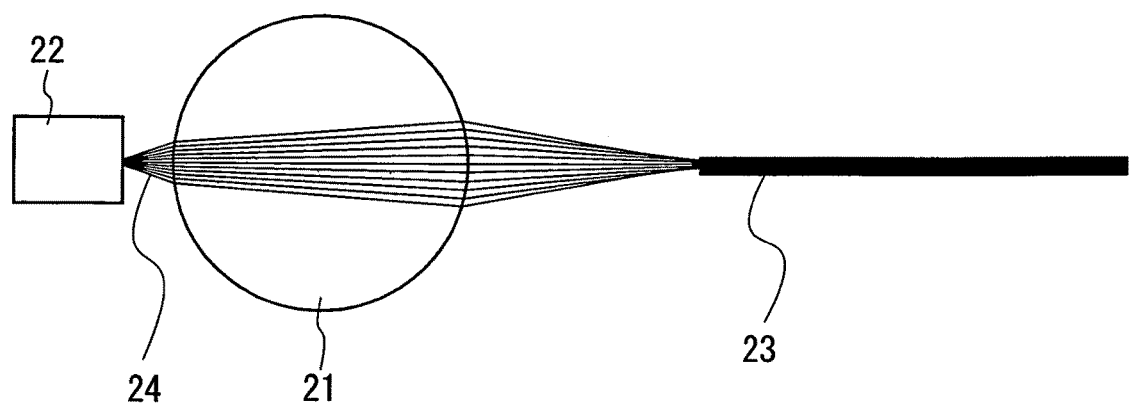
FIG. 2 is a diagram illustrating an example of a titanium-containing oxide glass of the present invention being used as a coupling lens.

FIG. 2 is a diagram showing a schematic illustration of a spherical titanium-containing oxide glass used as a coupling lens for optical communications. A titanium-containing oxide glass 21 can be used as a coupling lens that condenses a beam 24 emitted by a semiconductor laser 22 and couples it to a single-mode fiber (SMF) 23. Because the spherical aberration of a spherical lens becomes smaller as the refractive index increases, a material with a high refractive index, such as a titanium-containing oxide glass of the present invention, is suitable as a coupling ball lens. When using a titanium-containing oxide glass of the present invention as a coupling lens, the refractive index preferably should be 2.0 or more.

<SIL (Solid Immersion Lens)>

Figure 3:
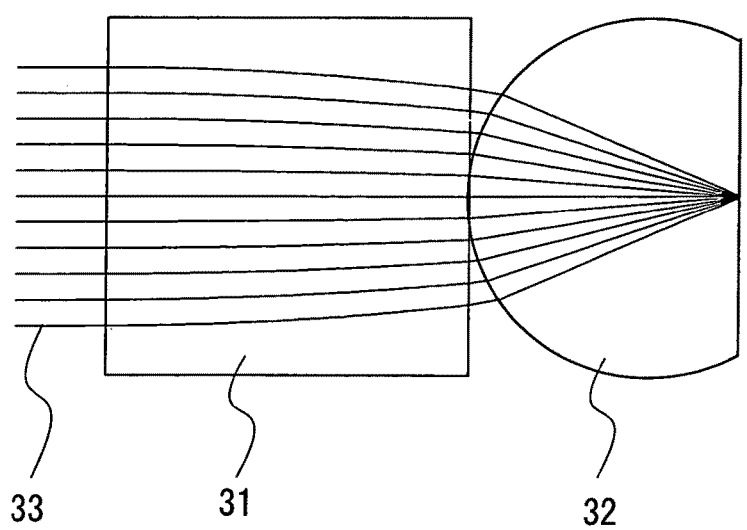
FIG. 3 is a diagram illustrating an example of a titanium-containing oxide glass of the present invention being used as a SIL.
Figure 4:
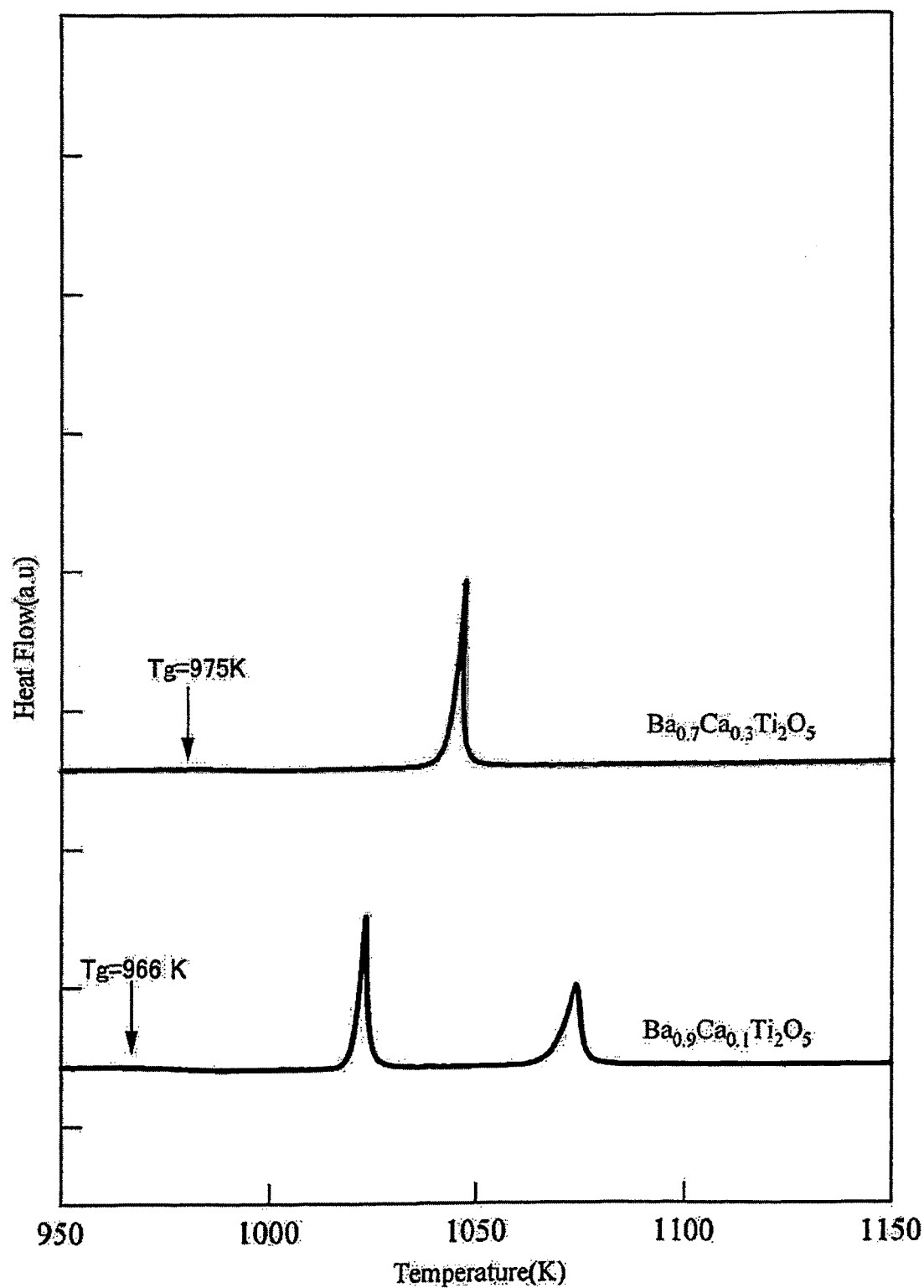
FIG. 4 is a chart representing a result of differential thermal analysis (DTA) performed on a sample prepared in Example 1.
Figure 5:
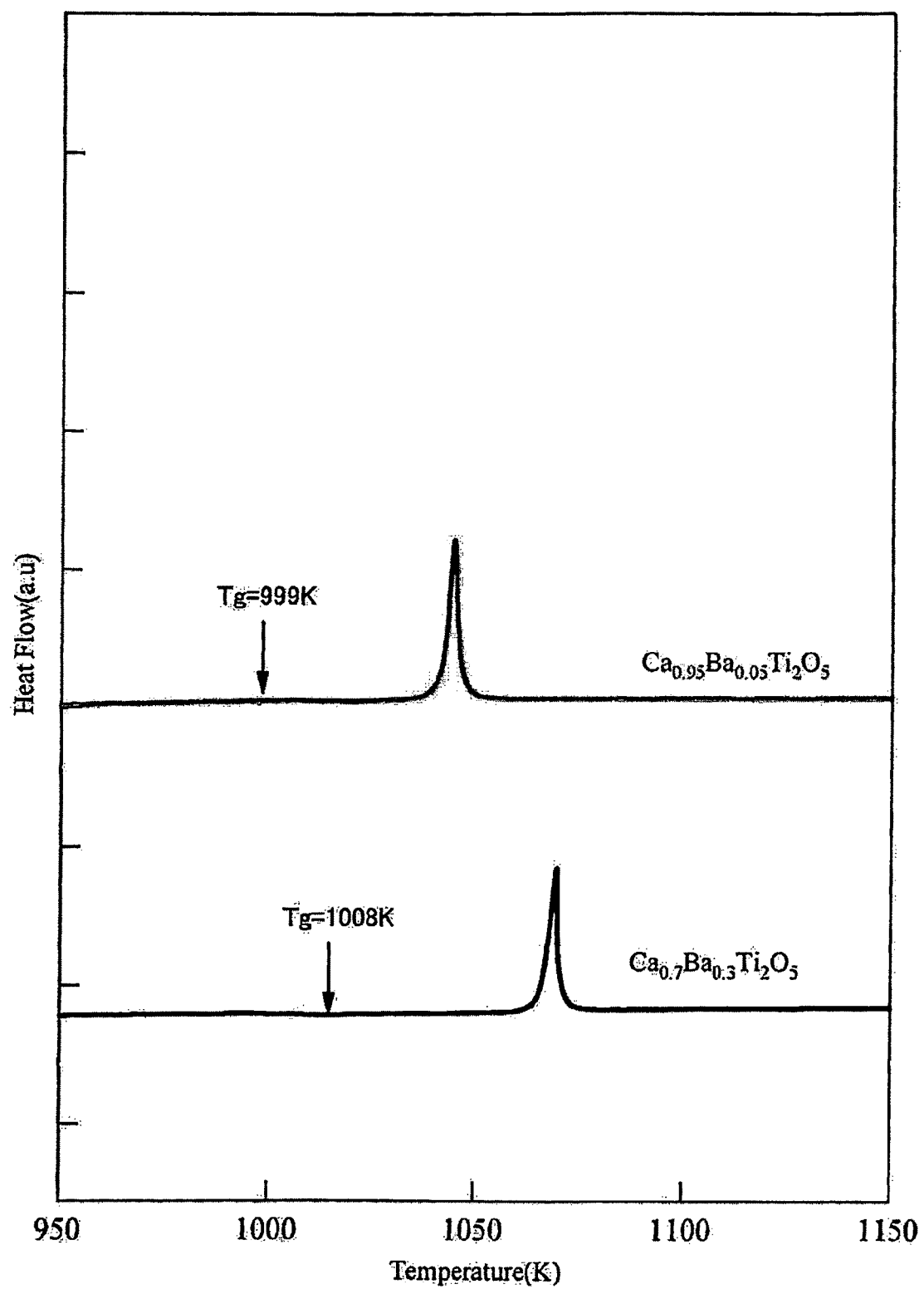
FIG. 5 is a chart representing a result of differential thermal analysis (DTA) performed on a sample prepared in Example 1.
Figure 6:
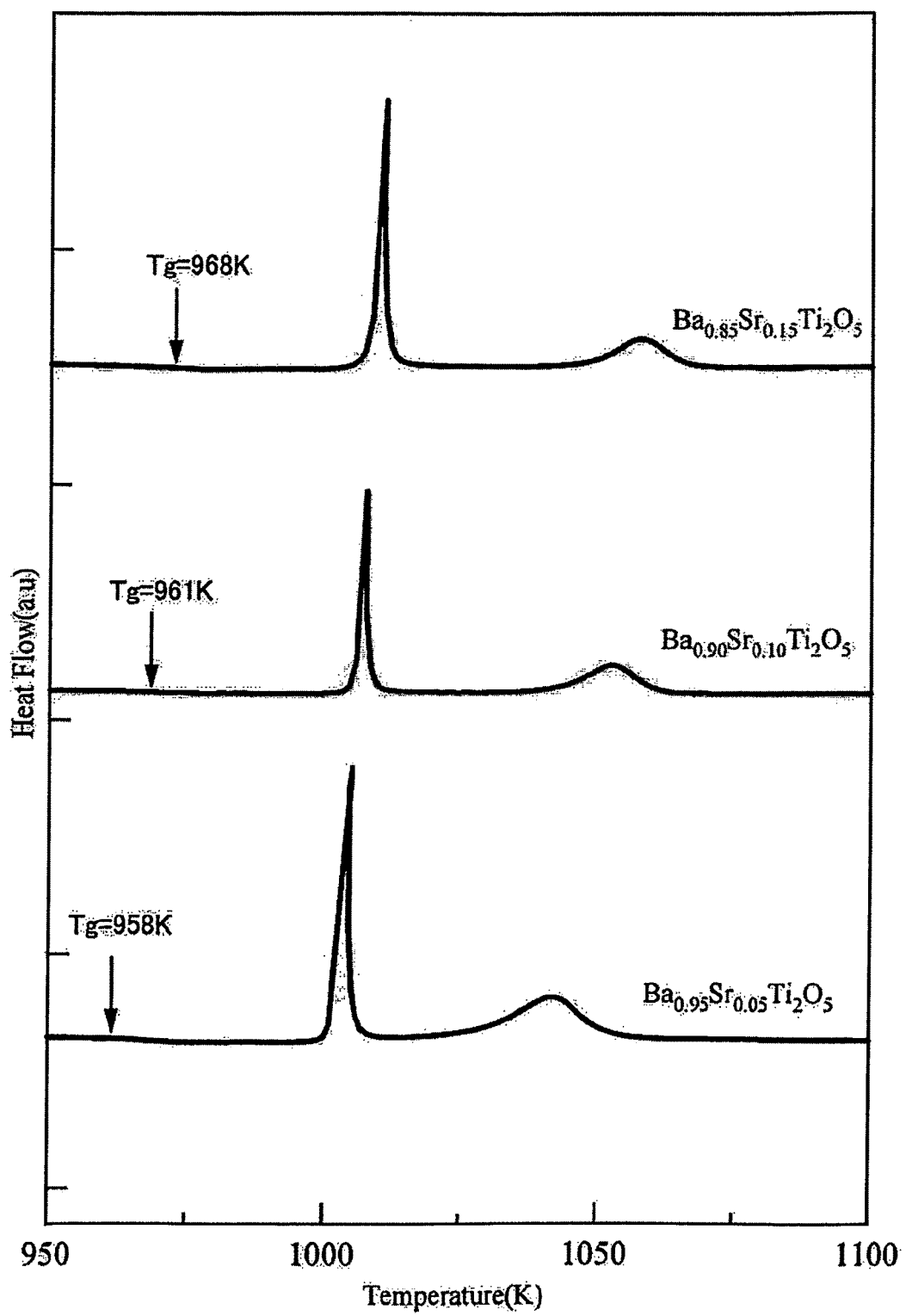
FIG. 6 is a chart representing a result of differential thermal analysis (DTA) performed on a sample prepared in Example 1.
Figure 7:
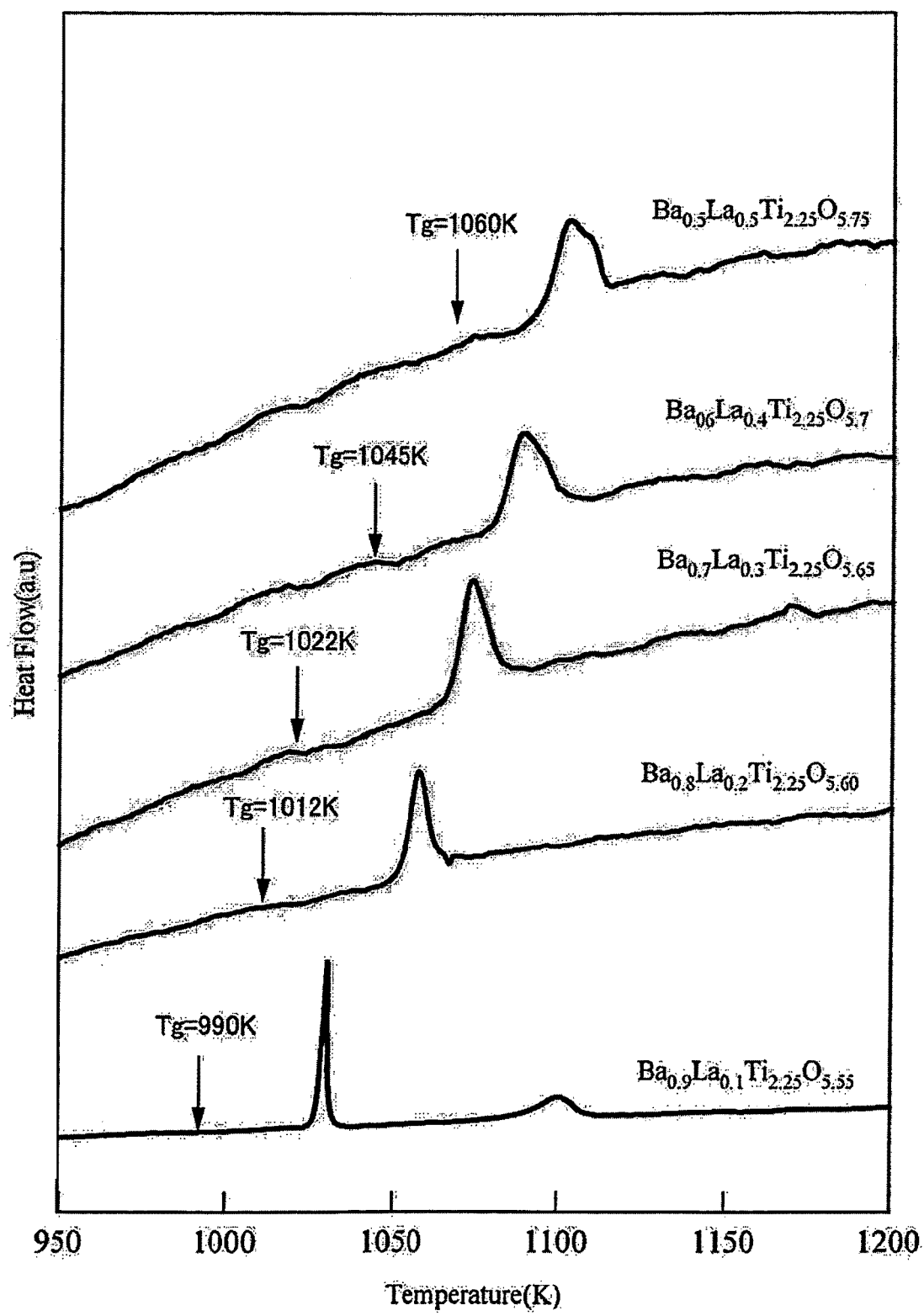
FIG. 7 is a chart representing a result of differential thermal analysis (DTA) performed on a sample prepared in Example 1.
Figure 8:
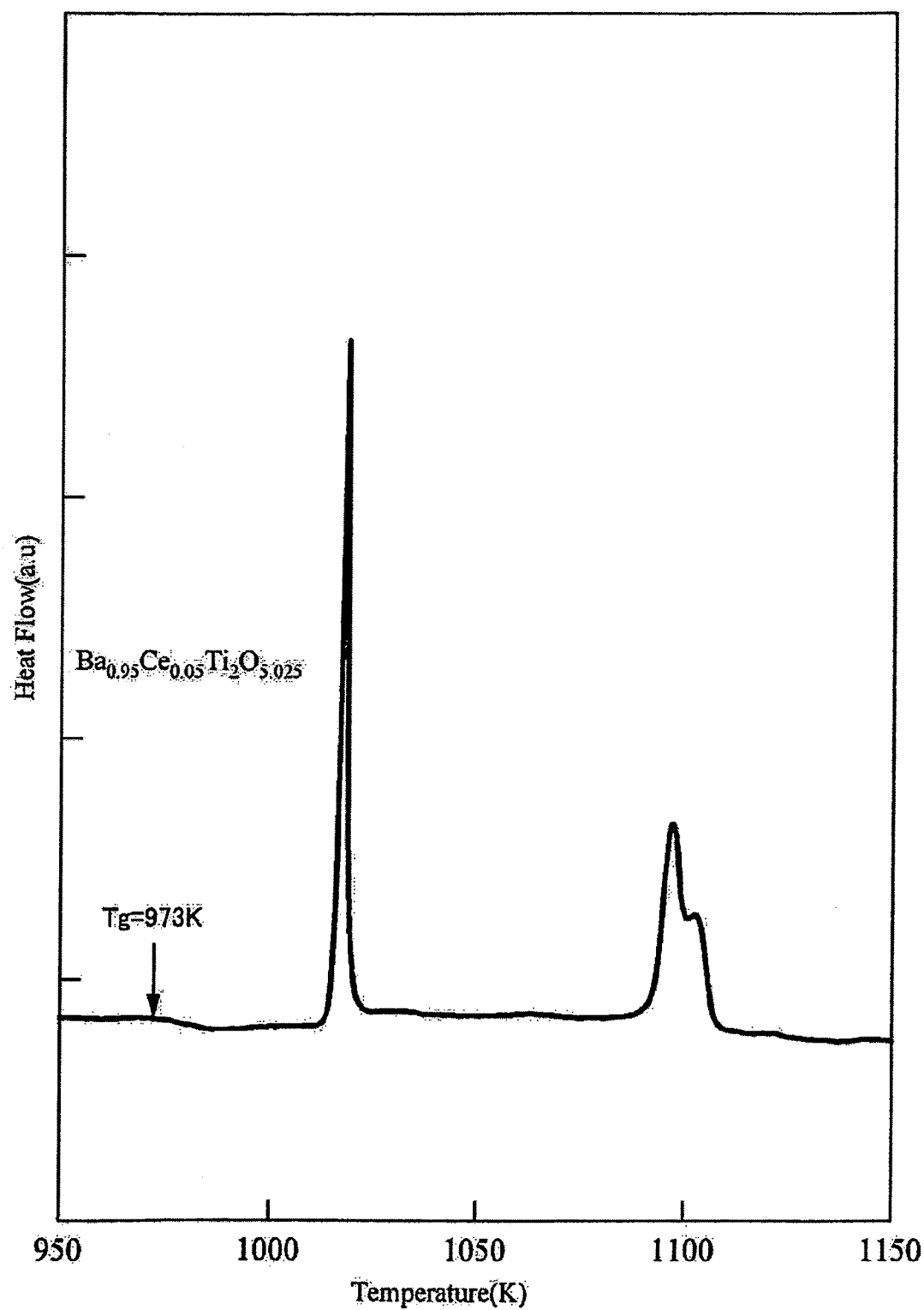
FIG. 8 is a chart representing a result of differential thermal analysis (DTA) performed on a sample prepared in Example 1.
Figure 9:
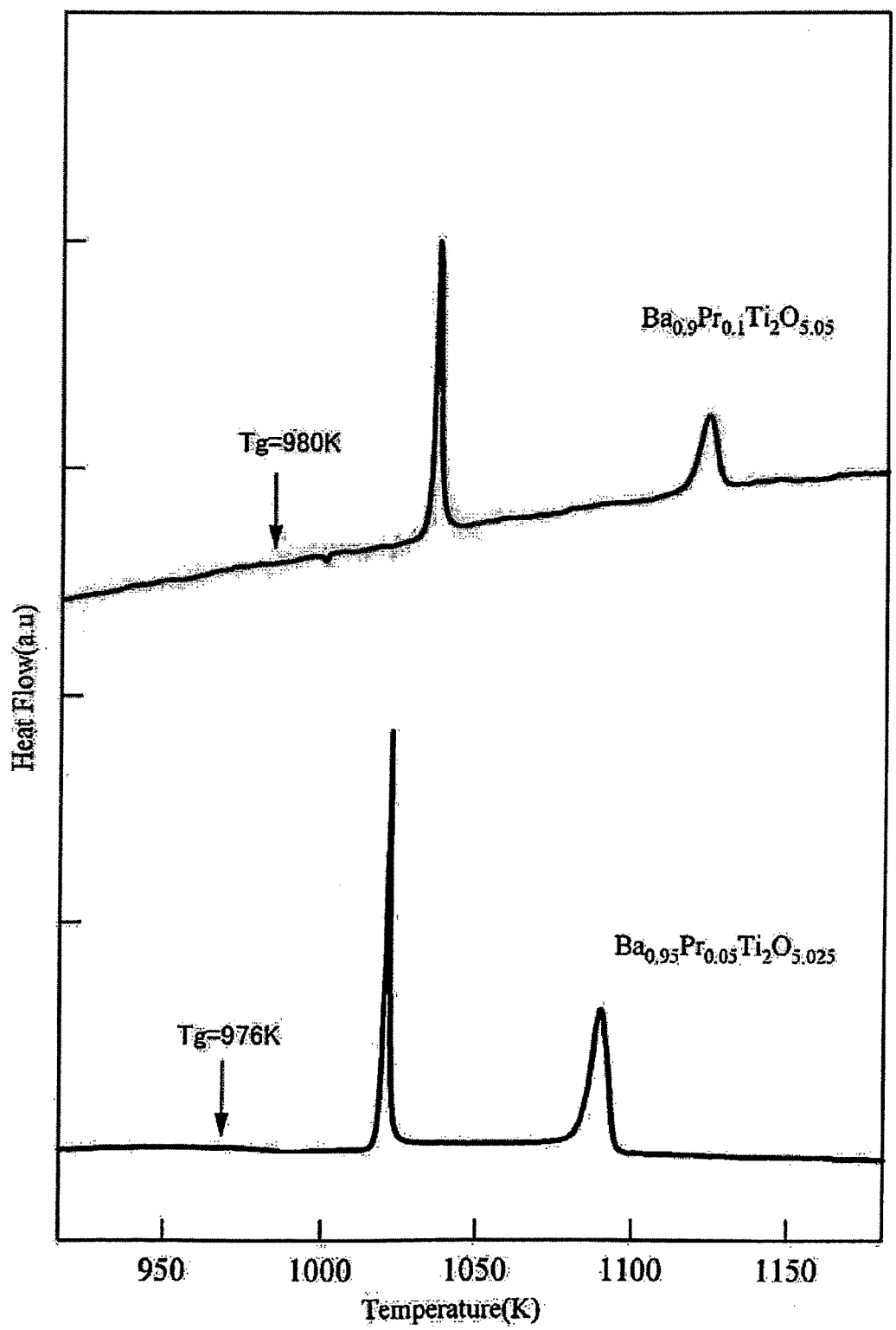
FIG. 9 is a chart representing a result of differential thermal analysis (DTA) performed on a sample prepared in Example 1.
Figure 10:
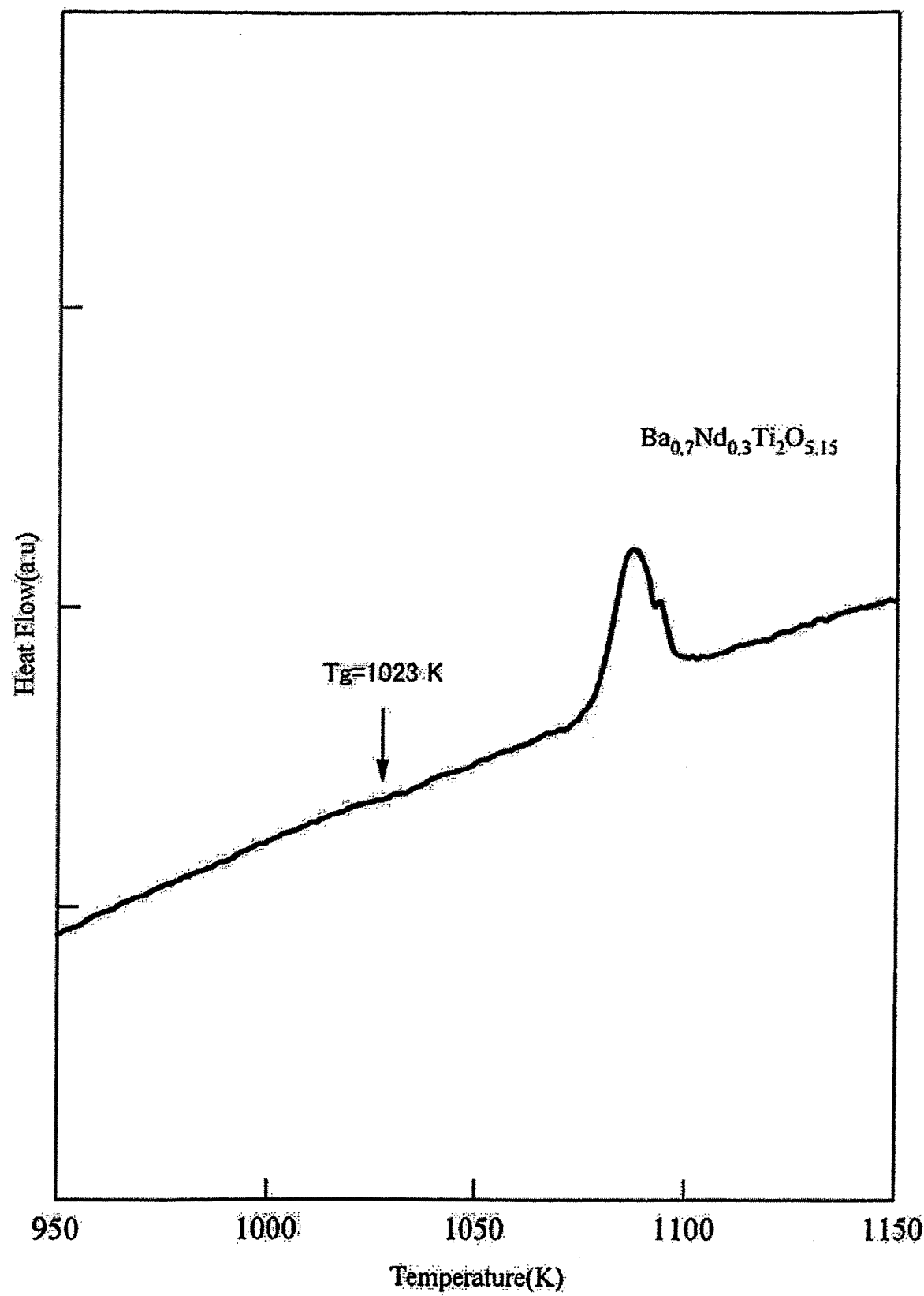
FIG. 10 is a chart representing a result of differential thermal analysis (DTA) performed on a sample prepared in Example 1.
Figure 11:
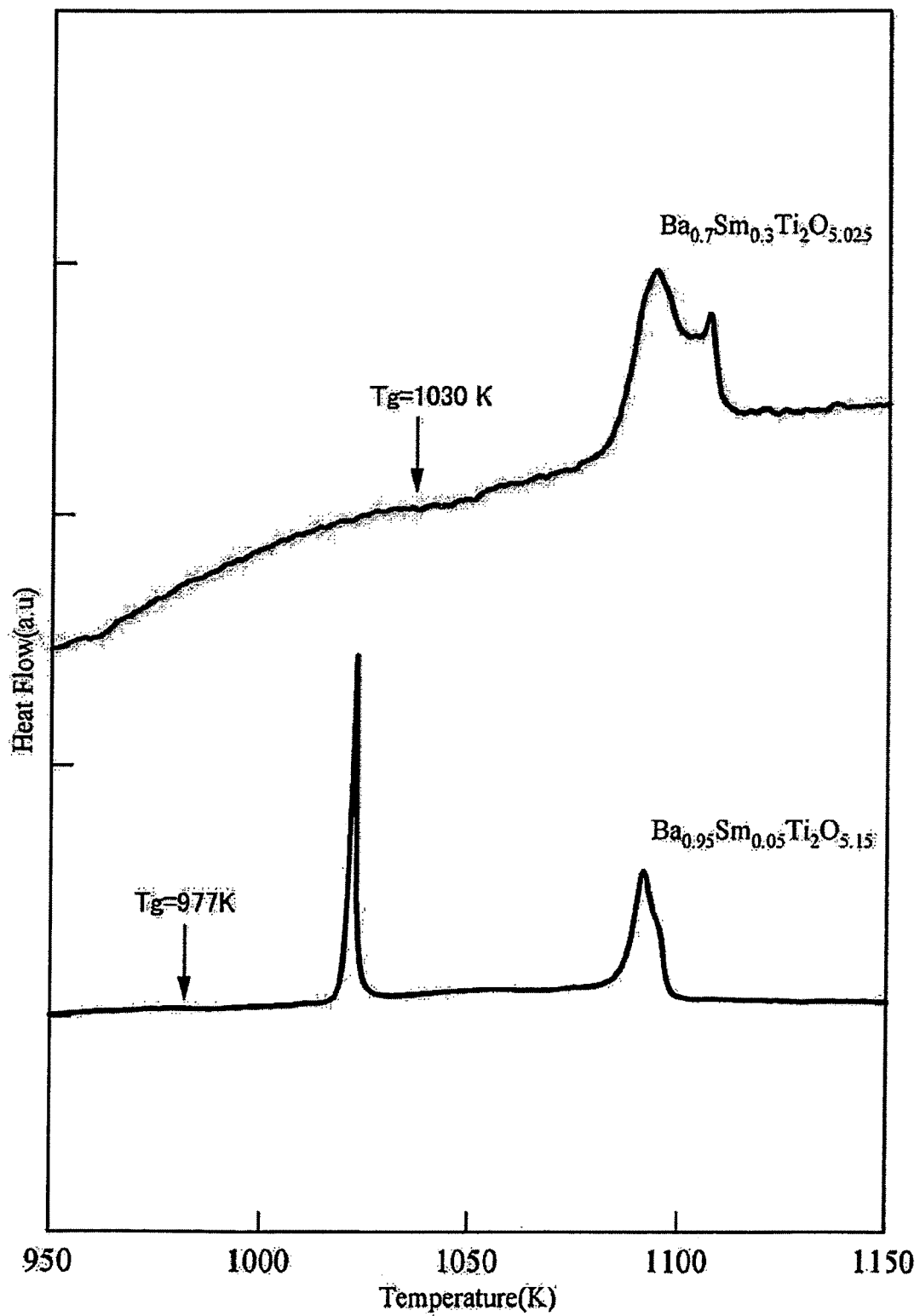
FIG. 11 is a chart representing a result of differential thermal analysis (DTA) performed on a sample prepared in Example 1.
Figure 12:
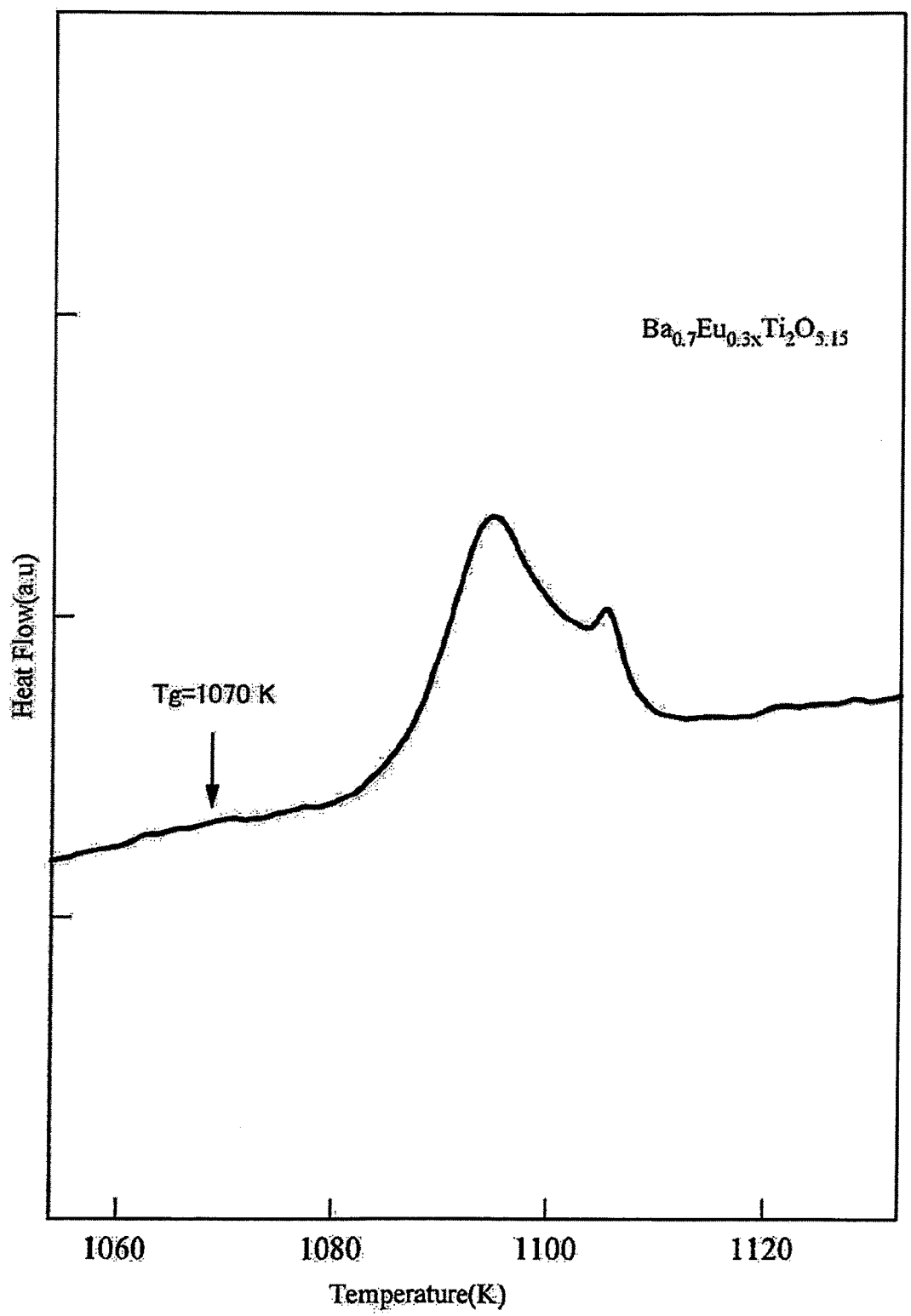
FIG. 12 is a chart representing a result of differential thermal analysis (DTA) performed on a sample prepared in Example 1.
Figure 13:
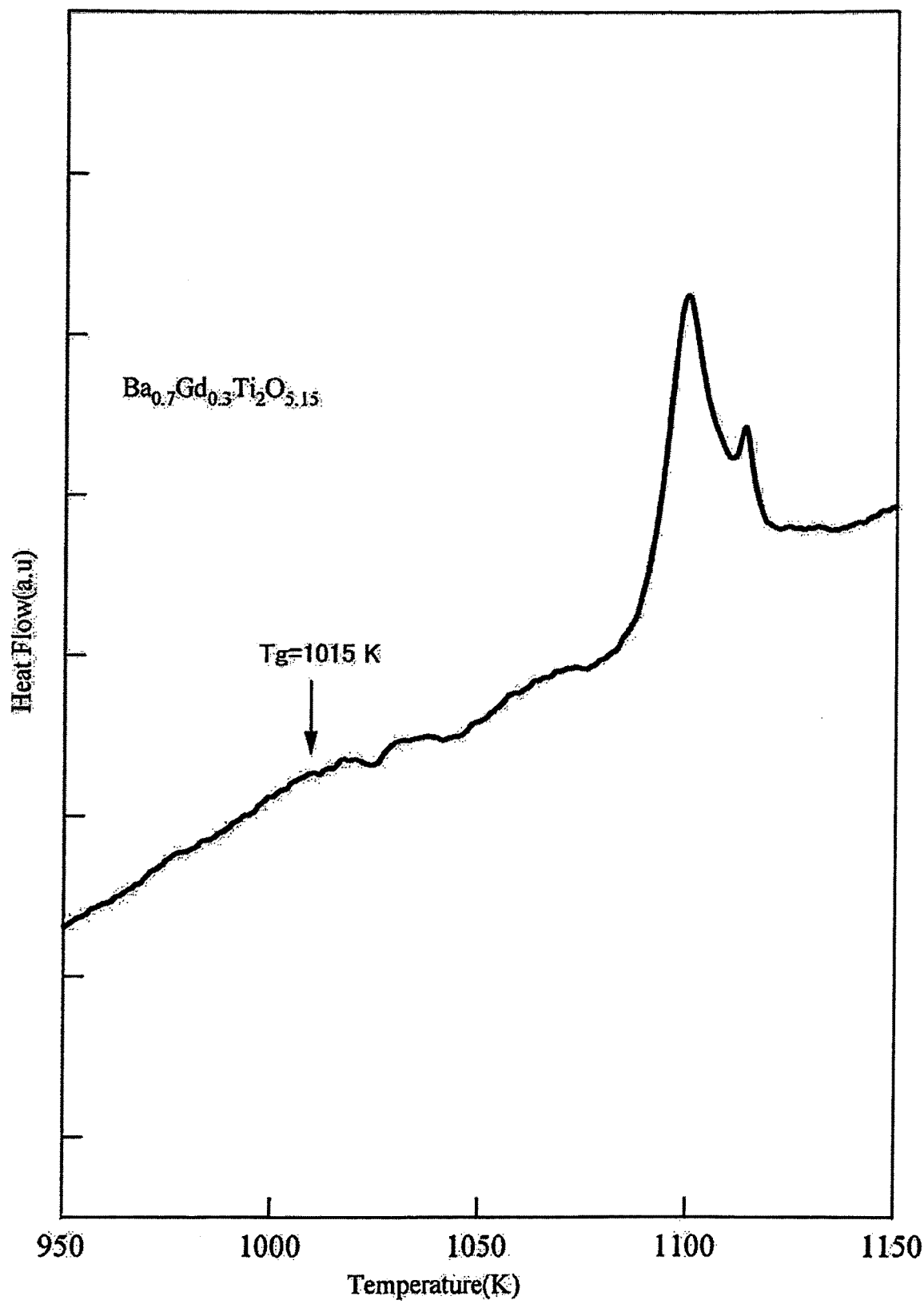
FIG. 13 is a chart representing a result of differential thermal analysis (DTA) performed on a sample prepared in Example 1.
Figure 14:
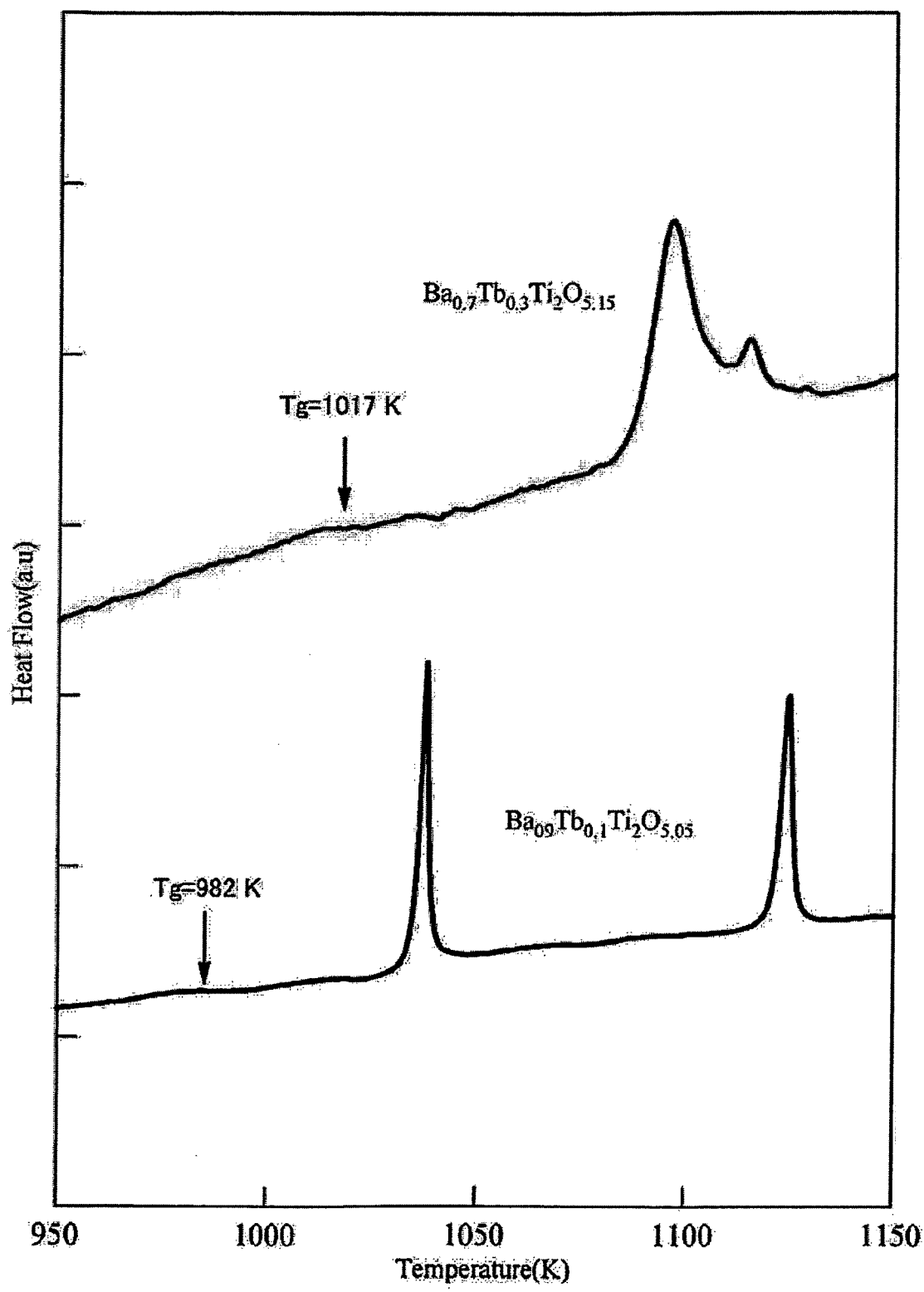
FIG. 14 is a chart representing a result of differential thermal analysis (DTA) performed on a sample prepared in Example 1.
Figure 15:
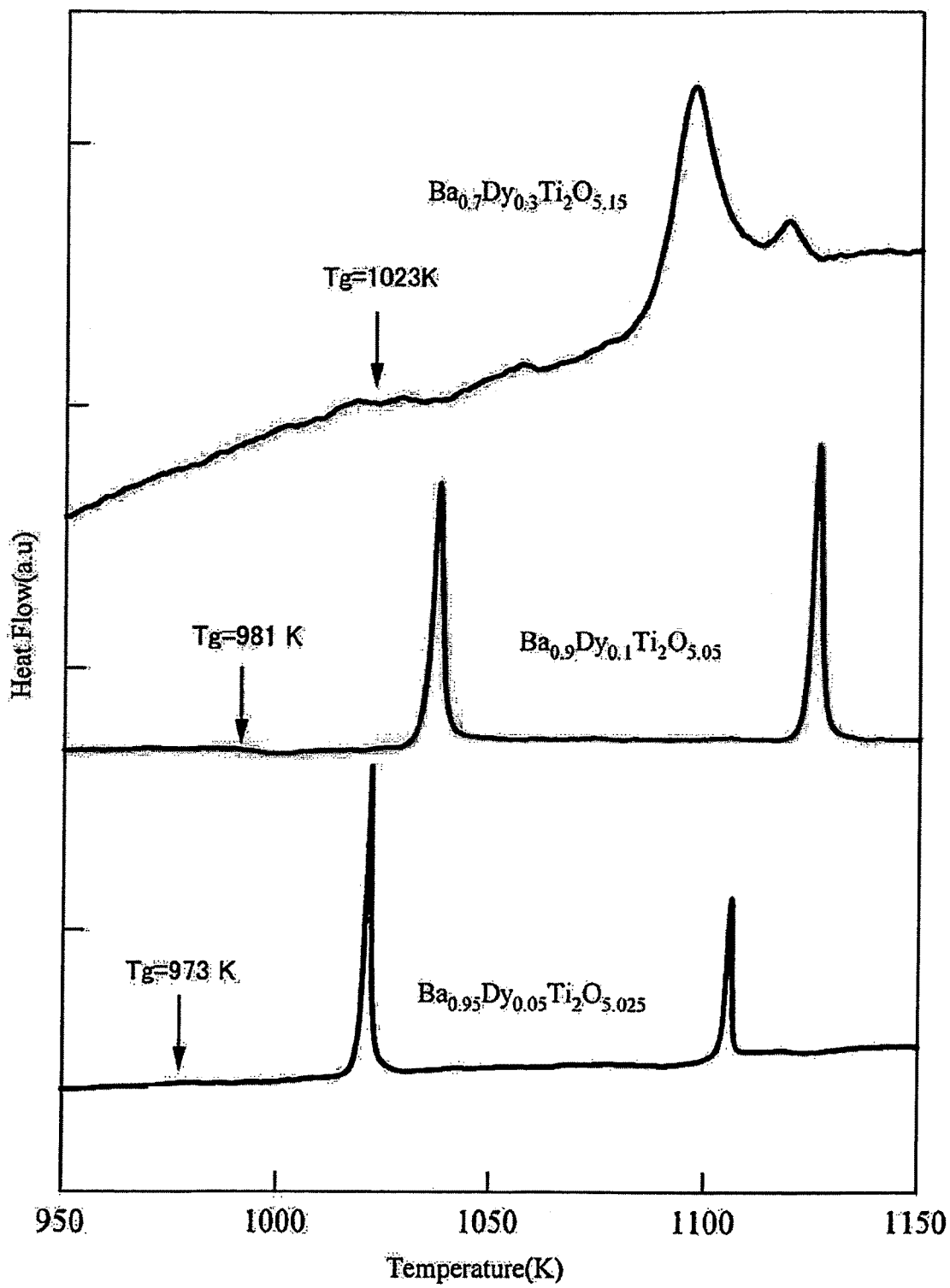
FIG. 15 is a chart representing a result of differential thermal analysis (DTA) performed on a sample prepared in Example 1.
Figure 16:
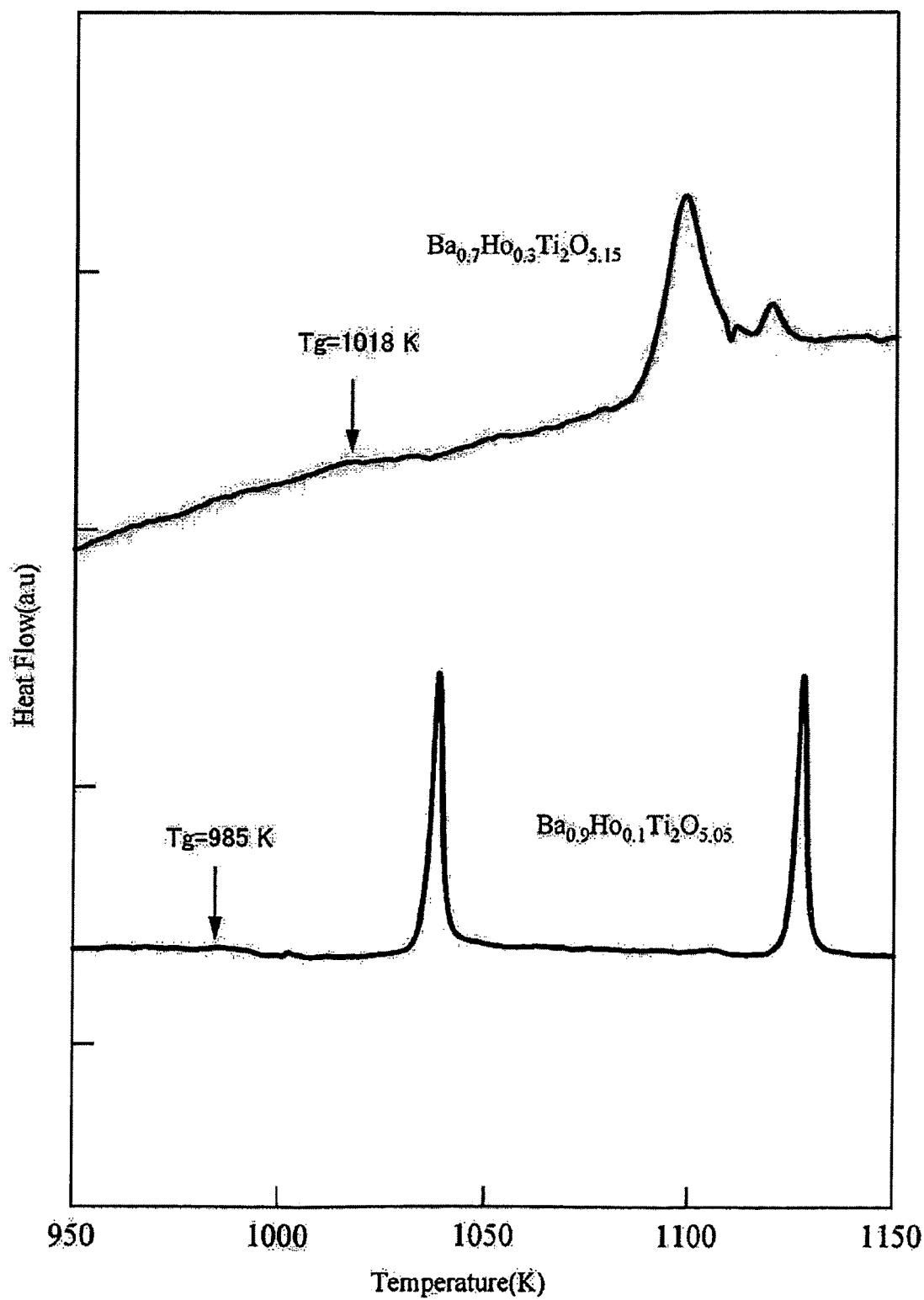
FIG. 16 is a chart representing a result of differential thermal analysis (DTA) performed on a sample prepared in Example 1.
Figure 17:
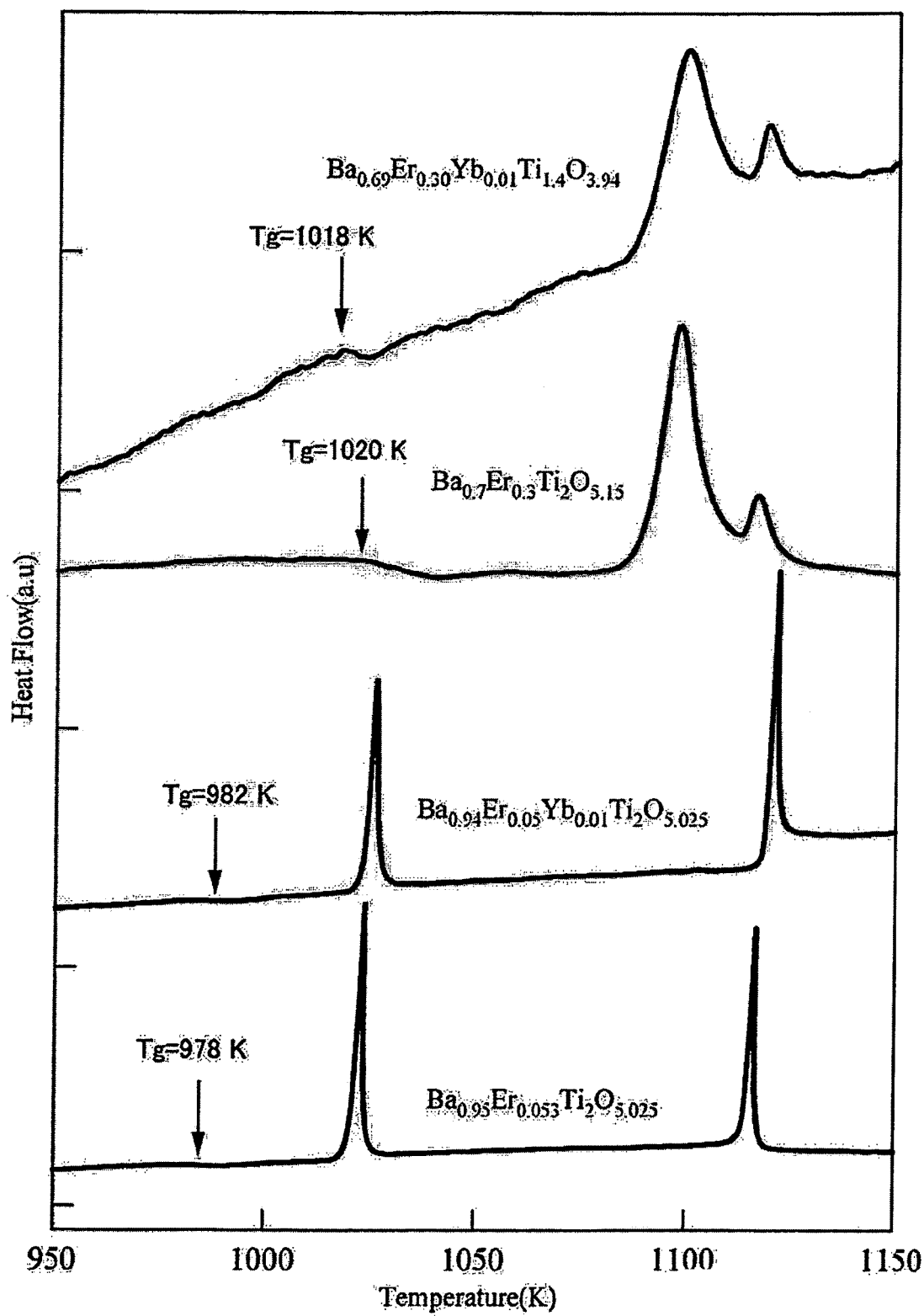
FIG. 17 is a chart representing a result of differential thermal analysis (DTA) performed on a sample prepared in Example 1.
Figure 18:
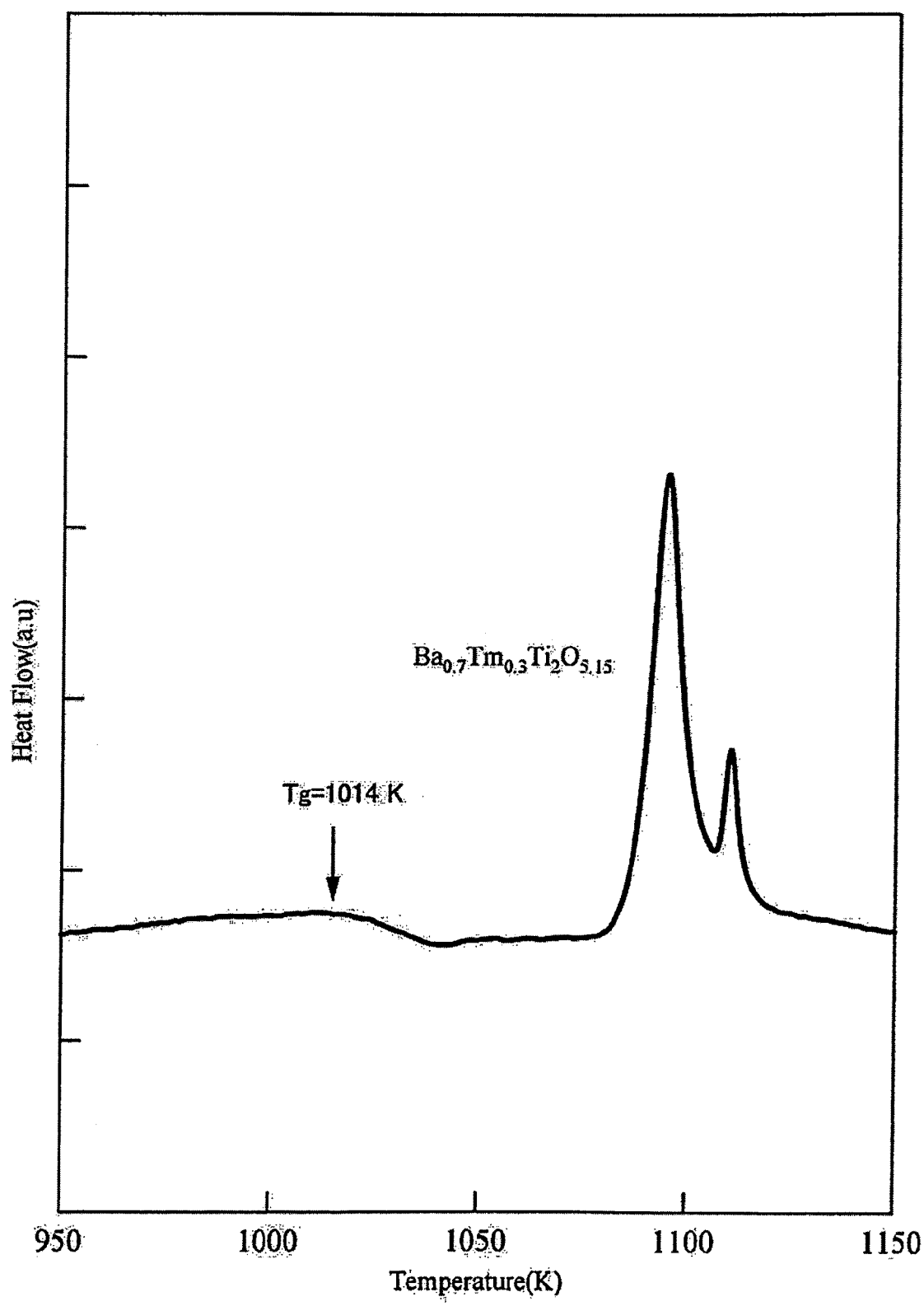
FIG. 18 is a chart representing a result of differential thermal analysis (DTA) performed on a sample prepared in Example 1.
Figure 19:
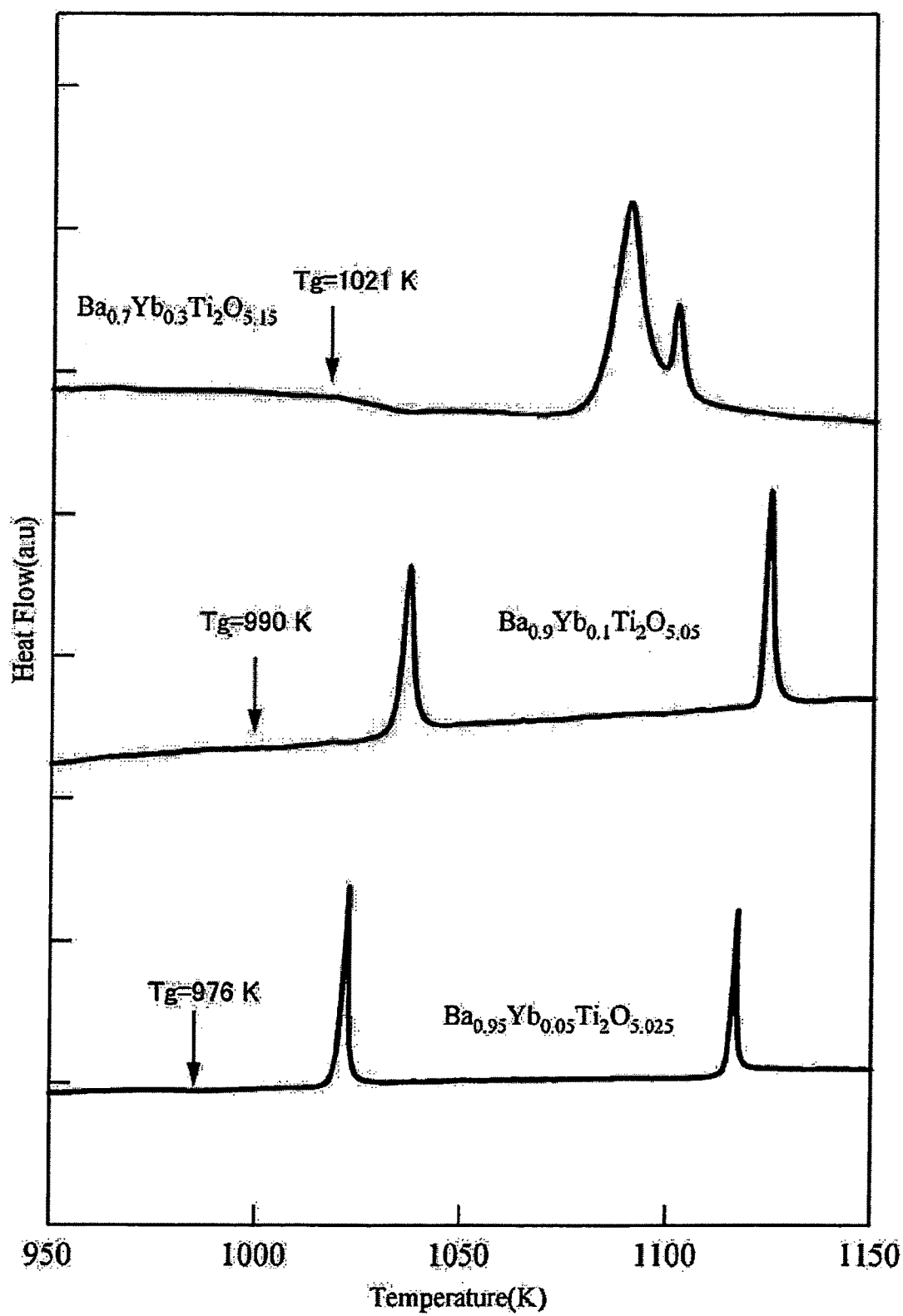
FIG. 19 is a chart representing a result of differential thermal analysis (DTA) performed on a sample prepared in Example 1.
Figure 20:
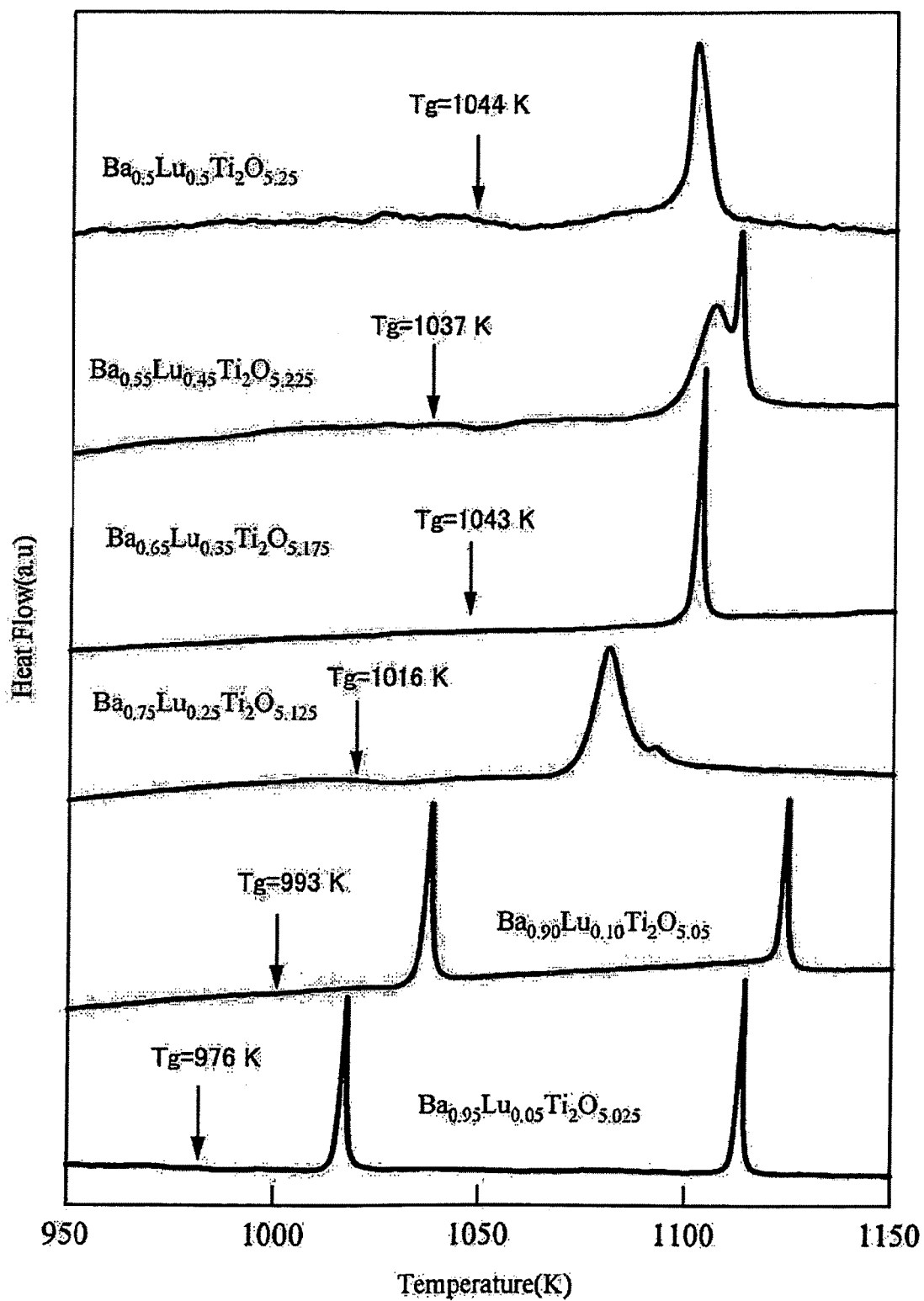
FIG. 20 is a chart representing a result of differential thermal analysis (DTA) performed on a sample-prepared in Example 1.
Figure 21:
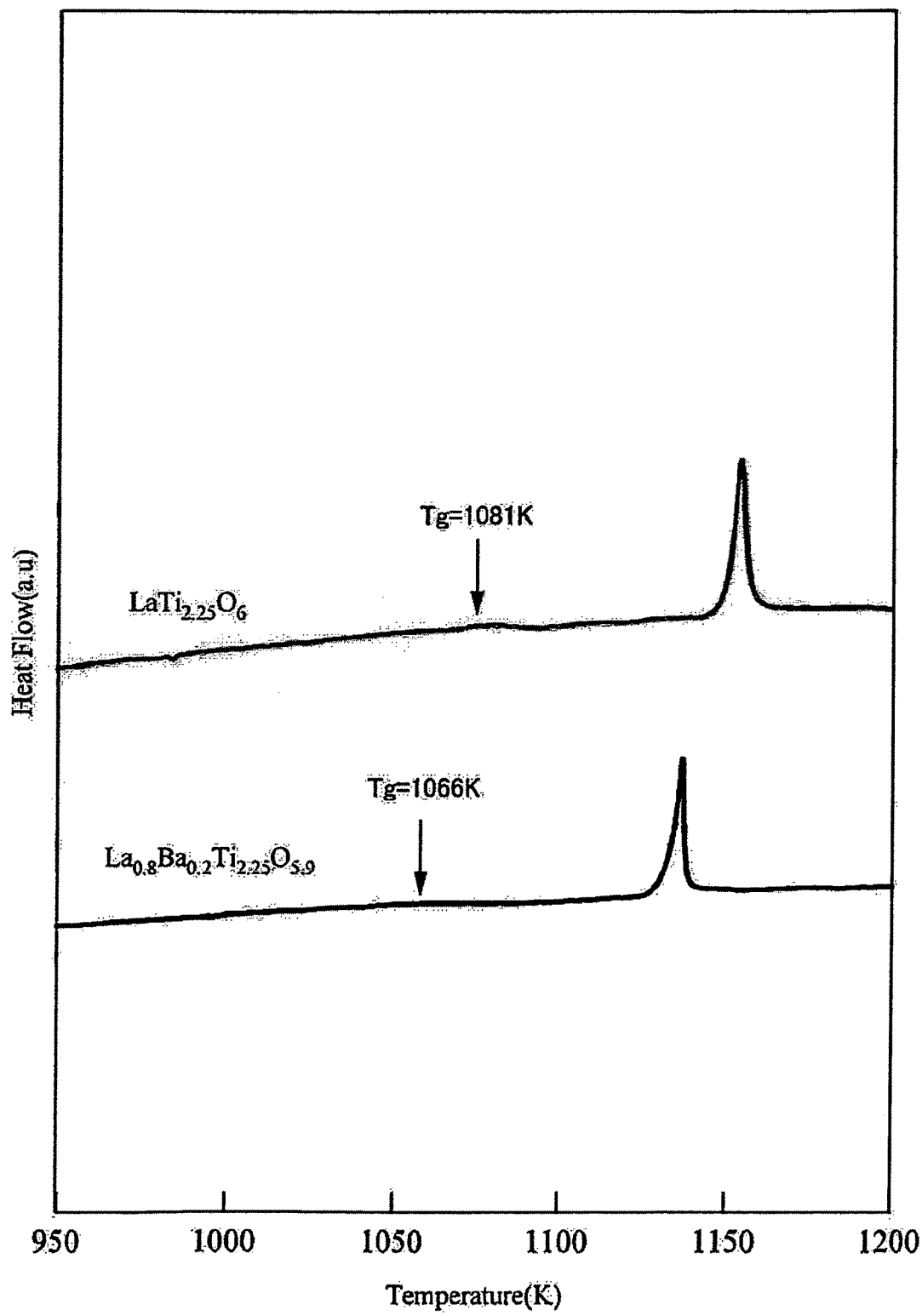
FIG. 21 is a chart representing a result of differential thermal analysis (DTA) performed on a sample prepared in Example 1.
Figure 22:
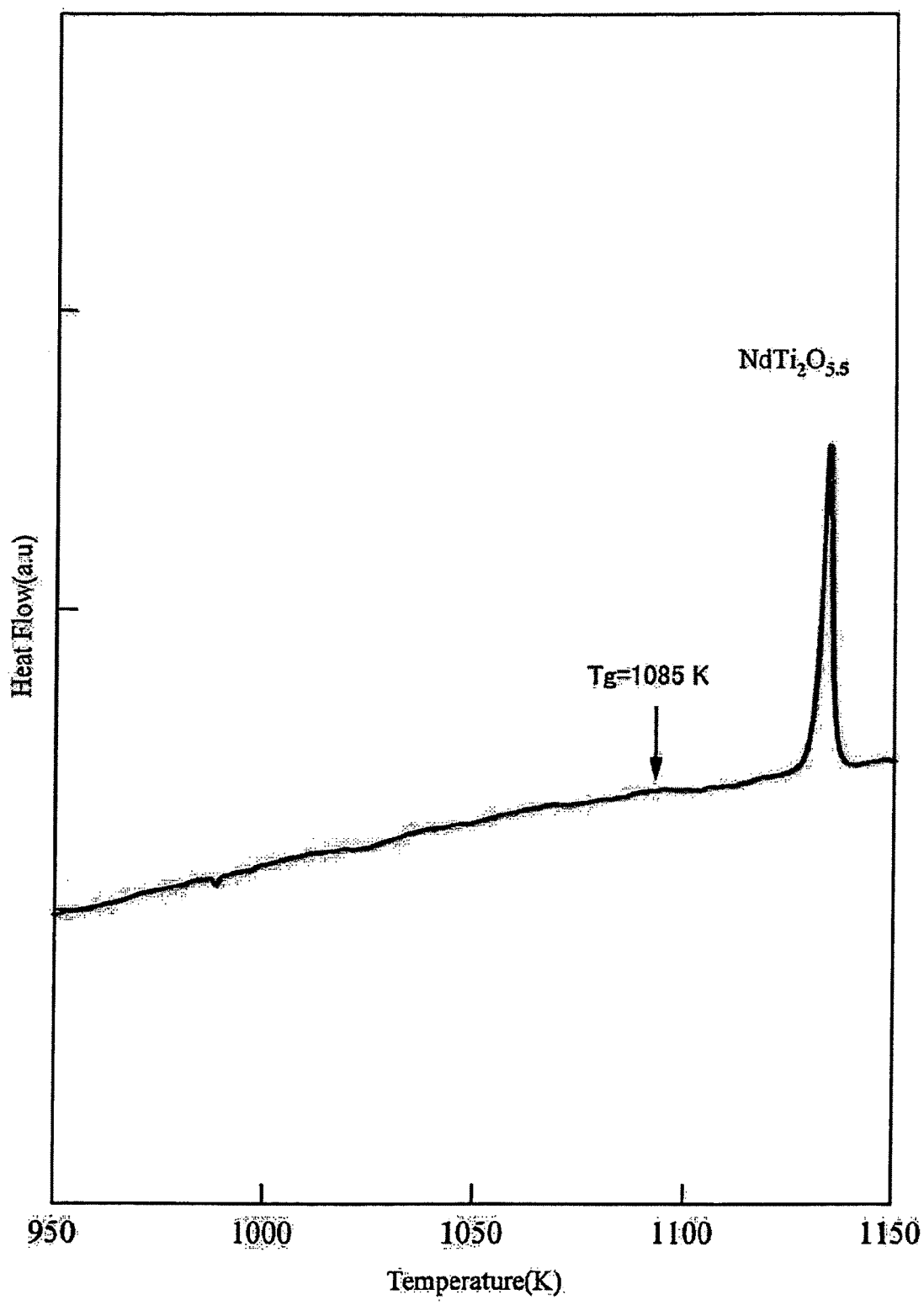
FIG. 22 is a chart representing a result of differential thermal analysis (DTA) performed on a sample prepared in Example 1.

FIG. 3 shows an example of an objective lens using a gradient index rod lens 31 combined with a ball lens 32 which has been processed into a dome shape by truncating a sphere. The figure also shows a beam 33. The hemispherical, or superhemispherical lens (a planarly truncated sphere, or more specifically, a shape obtained by cutting off a part of the sphere along a plane orthogonal to the center line of the sphere) acts to increase NA (numerical aperture) when placed in front of a focal point. Such a lens is called a SIL. NA increases as the refractive index of the SIL is increased. A titanium-containing oxide glass of the present invention has a notably high refractive index, and therefore suitably is used as a SIL.

EXAMPLES

Example 1

In this example, titanium-containing oxide glass samples represented by the formula $(M1)_{1-x}(M2)_xTi_{y2}O_z$ (y1=0, x, y2, and z falling in the ranges noted above) were prepared. The composition of each sample is shown in Table 1-1 and Table 1-2.

TABLE 1-1

| Sample | Composition | |
|---|---|---|
| 1-1 | $Ba_{(1-x)}Ca_xTi_{y2}O_z$ | $Ba_{0.9}Ca_{0.1}Ti_2O_5$ |
|  |  | $Ba_{0.7}Ca_{0.3}Ti_2O_5$ |
| 1-2 | $Ca_{(1-x)}Ba_xTi_{y2}O_z$ | $Ca_{0.7}Ba_{0.3}Ti_2O_5$ |
|  |  | $Ca_{0.95}Ba_{0.05}Ti_2O_5$ |
| 1-3 | $Ba_{(1-x)}Sr_xTi_{y2}O_z$ | $Ba_{0.95}Sr_{0.05}Ti_2O_5$ |
|  |  | $Ba_{0.9}Sr_{0.1}Ti_2O_5$ |
|  |  | $Ba_{0.85}Sr_{0.15}Ti_2O_5$ |
| 1-4 | $Ba_{(1-x)}La_xTi_{y2}O_z$ | $Ba_{0.9}La_{0.1}Ti_{2.25}O_{5.55}$ |
|  |  | $Ba_{0.8}La_{0.2}Ti_{2.25}O_{5.6}$ |
|  |  | $Ba_{0.7}La_{0.3}Ti_{2.25}O_{5.65}$ |
|  |  | $Ba_{0.6}La_{0.4}Ti_{2.25}O_{5.7}$ |
|  |  | $Ba_{0.5}La_{0.5}Ti_{2.25}O_{5.75}$ |
| 1-5 | $La_{(1-x)}Ba_xTi_{y2}O_z$ | $La_{0.8}Ba_{0.2}Ti_{2.25}O_{5.9}$ |
|  |  | $La_{1.0}Ti_{2.25}O_6$ |
| 1-6 | $Ba_{(1-x)}Ce_xTi_{y2}O_z$ | $Ba_{0.95}Ce_{0.05}Ti_2O_{5.025}$ |
| 1-7 | $Ba_{(1-x)}Pr_xTi_{y2}O_z$ | $Ba_{0.95}Pr_{0.05}Ti_2O_{5.025}$ |
|  |  | $Ba_{0.9}Pr_{0.1}Ti_2O_{5.05}$ |
| 1-8 | $Ba_{(1-x)}Nd_xTi_{y2}O_z$ | $Ba_{0.7}Nd_{0.3}Ti_2O_{5.15}$ |
| 1-9 | $Nd_{(1-x)}Ba_xTi_{y2}O_z$ | $Nd_{1.0}Ti_2O_{5.5}$ |
| 1-10 | $Ba_{(1-x)}Sm_xTi_{y2}O_z$ | $Ba_{0.95}Sm_{0.05}Ti_2O_{5.15}$ |
|  |  | $Ba_{0.7}Sm_{0.3}Ti_2O_{5.025}$ |

TABLE 1-2

| Sample | Composition | |
|---|---|---|
| 1-11 | $Ba_{(1-x)}Eu_xTi_{y2}O_z$ | $Ba_{0.7}Eu_{0.30}Ti_2O_{5.15}$ |
| 1-12 | $Ba_{(1-x)}Gd_xTi_{y2}O_z$ | $Ba_{0.7}Gd_{0.3}Ti_2O_{5.15}$ |
| 1-13 | $Ba_{(1-x)}Tb_xTi_{y2}O_z$ | $Ba_{0.9}Tb_{0.1}Ti_2O_{5.05}$ |
|  |  | $Ba_{0.7}Tb_{0.3}Ti_2O_{5.15}$ |
| 1-14 | $Ba_{(1-x)}Dy_xTi_{y2}O_z$ | $Ba_{0.95}Dy_{0.05}Ti_2O_{5.025}$ |
|  |  | $Ba_{0.9}Dy_{0.1}Ti_2O_{5.05}$ |
|  |  | $Ba_{0.7}Dy_{0.3}Ti_2O_{5.15}$ |
| 1-15 | $Ba_{(1-x)}Ho_xTi_{y2}O_z$ | $Ba_{0.9}Ho_{0.1}Ti_2O_{5.05}$ |
|  |  | $Ba_{0.7}Ho_{0.3}Ti_2O_{5.15}$ |
| 1-16 | $Ba_{(1-x)}Er_xTi_{y2}O_z$ | $Ba_{0.95}Er_{0.053}Ti_2O_{5.025}$ |
|  |  | $Ba_{0.7}Er_{0.3}Ti_2O_{5.15}$ |
| 1-17 | $Ba_{(1-x)}(Er, Yb)_xTi_{y2}O_z$ | $Ba_{0.94}Er_{0.05}Yb_{0.01}Ti_2O_{5.025}$ |
|  |  | $Ba_{0.69}Er_{0.30}Yb_{0.01}Ti_{1.4}O_{3.94}$ |

TABLE 1-2-continued

| Sample | Composition | |
|---|---|---|
| 1-18 | $Ba_{(1-x)}Tm_xTi_{y2}O_z$ | $Ba_{0.7}Tm_{0.3}Ti_2O_{5.15}$ |
| 1-19 | $Ba_{(1-x)}Yb_xTi_{y2}O_z$ | $Ba_{0.95}Yb_{0.05}Ti_2O_{5.025}$ |
| | | $Ba_{0.9}Yb_{0.1}Ti_2O_{5.05}$ |
| | | $Ba_{0.7}Yb_{0.3}Ti_2O_{5.15}$ |
| 1-20 | $Ba_{(1-x)}Lu_xTi_{y2}O_z$ | $Ba_{0.95}Lu_{0.05}Ti_2O_{5.025}$ |
| | | $Ba_{0.9}Lu_{0.1}Ti_2O_{5.05}$ |
| | | $Ba_{0.75}Lu_{0.25}Ti_2O_{5.125}$ |
| | | $Ba_{0.65}Lu_{0.35}Ti_2O_{5.175}$ |
| | | $Ba_{0.55}Lu_{0.45}Ti_2O_{5.225}$ |
| | | $Ba_{0.5}Lu_{0.5}Ti_2O_{5.25}$ |

First, raw material powders were weighed and mixed to obtain the sample compositions shown in Table 1-1 and Table 1-2. The oxide powders, weighed, were wet-blended in an agate mortar using ethanol (first wet-blending), and the blend was pre-fired. Specifically, the powder blend was placed in an electric furnace after drying, and pre-fired therein at 1,000° C. for 12 hours to sinter the powders. Then, the powders were wet-blended again with ethanol (second wet-blending). The powder blend was then placed in a rubber tube, and press-molded into a rod shape under hydrostatic pressure. The resulting rod was cut out to obtain a solid of about 2 mm² in size, which was then final-fired at 1,250° C. for 12 hours to obtain a glass raw material used to prepare the samples.

The glass raw material prepared as above was used to make glass samples. In this example, the levitation apparatus shown in FIG. 1 was used. First, a 2 mm² glass raw material was placed in the gas levitation furnace 2, and the material was levitated therein under the gas pressure of the compressed air gas flowing at the flow rate adjusted by the flow-rate adjuster 4. Then, a laser beam was shone on the levitating raw material to heat and melt the material at a temperature equal to or greater than the melting point of the material. Here, the material was heated to the appropriate temperature while measuring the temperature of the material with the radiation thermometer 11, and while monitoring the melting state of the material on the monitor 8 by observing the image captured by the imaging unit 7, taking into account the evaporation and the melting state of the material. The gas flow rate was adjusted while monitoring the levitation state of the raw material on the monitor 8, so as to levitate the molten raw material stably. After the raw material has melted completely, the molten state was maintained for 2 minutes to remove bubbles formed in the raw material melt. Thereafter, the laser beam was turned off to quench the raw material melt at a cooling rate of 1,000° C./sec. As a result, the material solidified. Note that no exothermic peak due to crystal solidification was observed in any of the cooling curves of the samples shown in Table 1.

Each sample, prepared as above, was measured using a differential thermal analysis (DTA). The measurement result of each sample is shown in FIG. 4 through FIG. 22. It can be seen from the results that the samples in FIG. 4 through FIG. 22 all have a glass transition point and a crystallization temperature. In other words, the results confirmed that all samples shown in Table 1-1 and Table 1-2 are vitreous at room temperature.

The samples prepared in this example contain an element represented by M2, except for $La_{1.0}Ti_{2.25}O_6$ of sample 1-5, and $Nd_{1.0}Ti_2O_{5.5}$ of sample 1-9 (x>0). The refractive index of glass is related to the mass (atomic number) of the element. Generally, the refractive index increases as the mass (atomic number) of the element becomes larger. In the titanium-containing oxide glass samples shown in Table 1-1 and Table 1-2, the refractive index was shown to increase by the inclusion of the M2 element, and particularly, by the inclusion of a lanthanoid element, used as a substituting element (M2), having a larger atomic number than Ba. For example, the refractive index nd, which is 2.14 in $BaTi_{2.25}O_5$, increased to 2.26 in $Lu_{0.7}La_{0.3}Ti_{2.25}O_5$ (M1=Lu, x=0.3). Further, lanthanoid elements having two ion valence numbers (for example, $Er^{2+}$, $Er^{3+}$) react with oxygen by undergoing changes in valence in a molten state, and thereby absorb bubbles in the melt ($4ErO+O_2 \rightarrow 2Er_2O_3$). Thus, the bubbles in the glass can be removed by selecting M2 from such elements.

Example 2

In this example, titanium-containing oxide glass samples represented by the formula $Ba(Ti_{1-y1}(M3)_{y1})_{y2}O_z$ (x=0, y1>0, y2 and z falling in the ranges noted above) were prepared. The composition of each sample is shown in Table 2. The method of preparing the glass raw material is as in Example 1. Further, the glass samples were produced by using the same apparatus and method as those used in Example 1.

TABLE 2

| Sample | Composition | |
|---|---|---|
| 2-1 | $Ba(Ti_{(1-y1)}V_{y1})_{y2}O_z$ | $BaTi_{1.99}V_{0.01}O_5$ |
| 2-2 | $Ba(Ti_{(1-y1)}Cr_{y1})_{y2}O_z$ | $BaTi_{1.98}Cr_{0.02}O_5$ |
| 2-3 | $Ba(Ti_{(1-y1)}Mn_{y1})_{y2}O_z$ | $BaTi_{1.99}Mn_{0.01}O_5$ |
| 2-4 | $Ba(Ti_{(1-y1)}Fe_{y1})_{y2}O_z$ | $BaTi_{1.95}Fe_{0.05}O_5$ |
| 2-5 | $Ba(Ti_{(1-y1)}Cu_{y1})_{y2}O_z$ | $BaTi_{1.998}Cu_{0.002}O_5$ |

Figure 23:
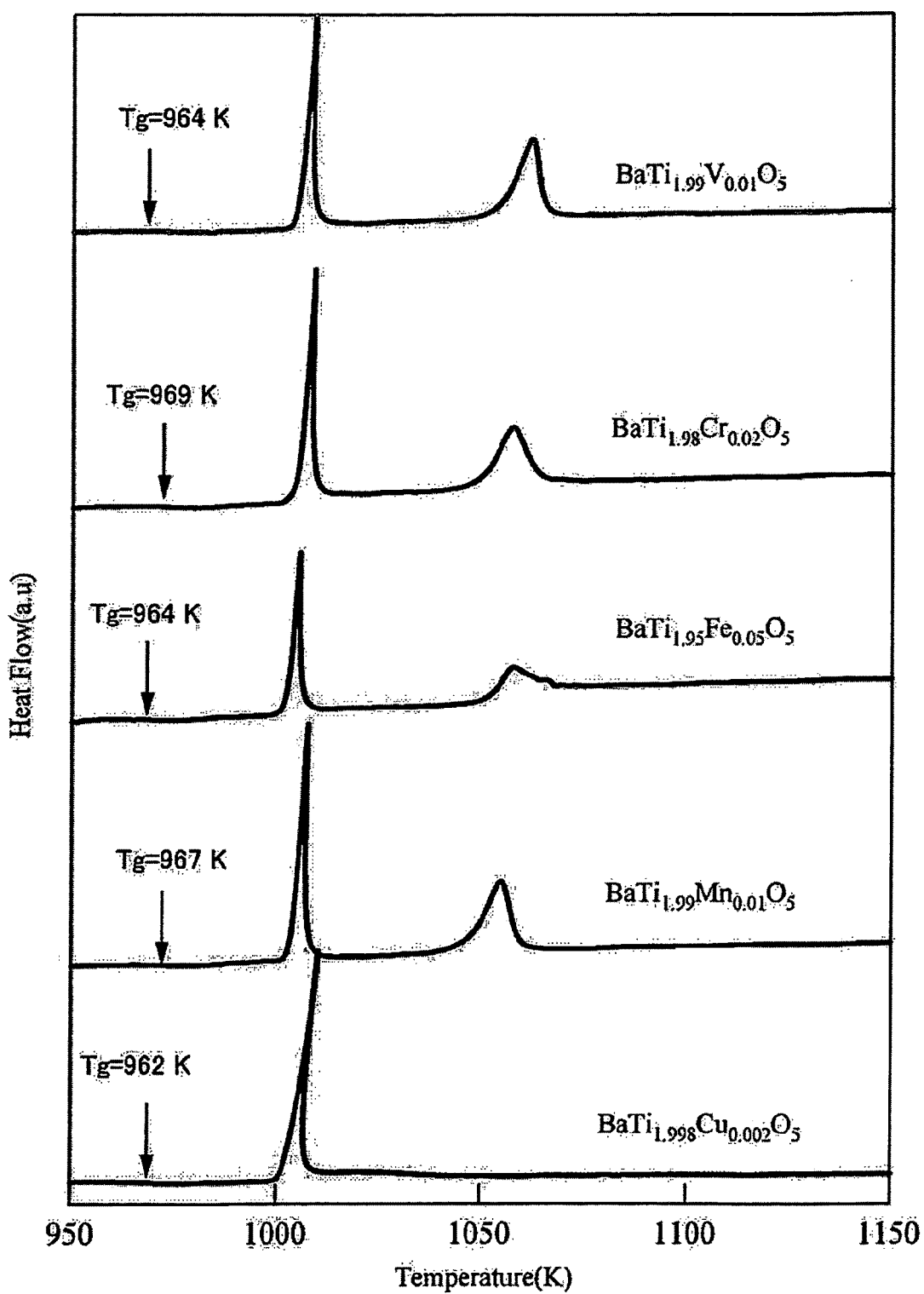
FIG. 23 is a chart representing a result of differential thermal analysis (DTA) performed on a sample prepared in Example 2.

Each sample, prepared as above, was measured using a differential thermal analysis (DTA). The measurement result of each sample is shown in FIG. 23. It can be seen from the results that the samples in FIG. 23 all have a glass transition point Tg and a crystallization temperature. In other words, the results confirmed that all samples shown in Table 2 are vitreous at room temperature.

The fact that all the titanium-containing oxide glasses of this example has y1>0 suggests that the inclusion of the highly magnetic and electrically conductive transitional metal element as the Ti-substituting element (M3) enables production of a glass having magnetic and electrically conductive properties.

Example 3

In this example, barium-titanium-containing oxide glass samples 3-1 through 3-46 represented by the formula $Ba_{1-x}(M2)_xTi_{y2}O_z$ (x>0, y1=0, y2 and z falling in the ranges noted above) were prepared. The composition of each sample is shown in Table 3-1 and Table 3-2. The method of preparing the glass raw material is as in Example 1. Further, the glass samples were produced by using the same apparatus and method as those used in Example 1.

Each sample, prepared as above, was measured in regard to diameter and refractive index, and the state of color was checked by visual inspection. The sample diameter was measured using a micrometer.

<Measurement Methods of Refractive Index and Sample Diameter>

Figure 24:
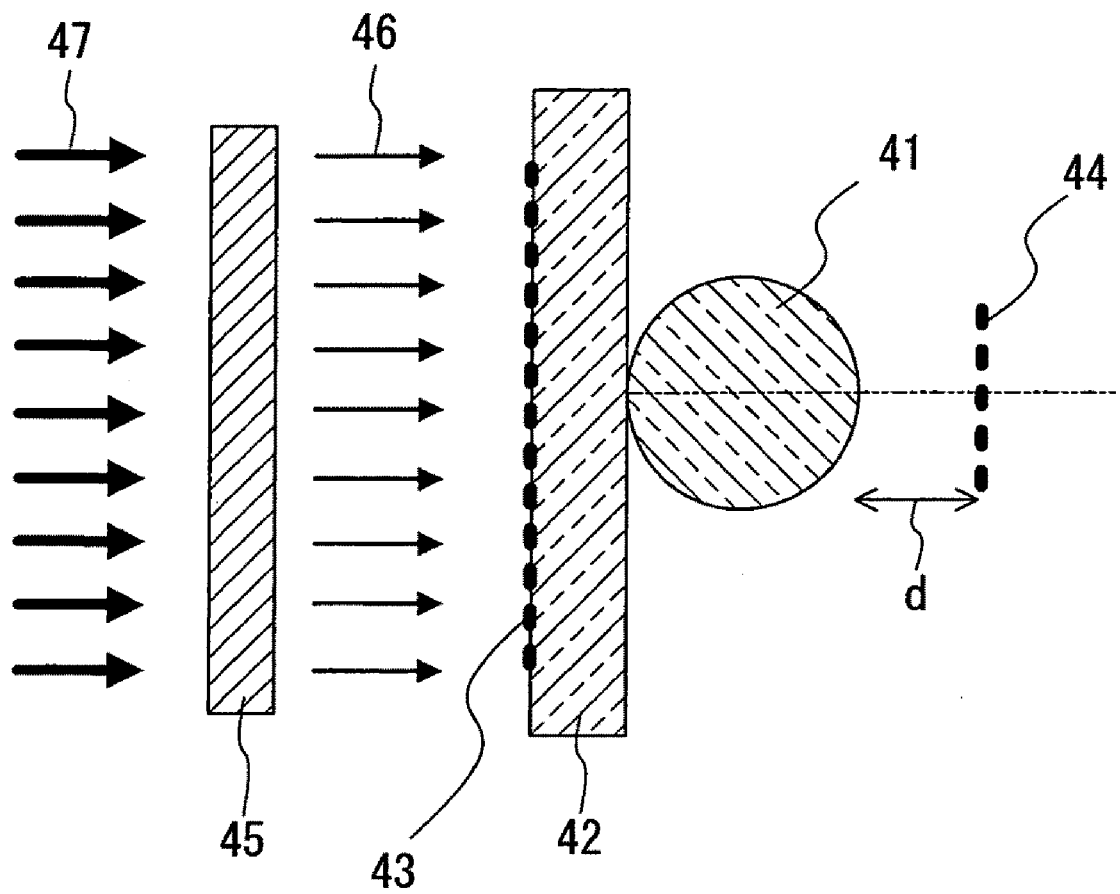
FIG. 24 is a diagram explaining a measurement method of refractive index.

In this example, the calculation of refractive index was performed by measuring a focal point with the sample spherical glass in place. Specifically, as shown in FIG. 24, a spherical glass 41 under measurement was disposed on a glass substrate 42, and light 46 of a predetermined wavelength was shone on a side of the glass substrate 42 opposite to a side where the spherical glass 41 was arranged. The focal point from the surface of the spherical glass 41 then was measured with a microscope. The focal point was measured by measuring distance d from the surface of the spherical lens 41 to a pattern image 44, which is the image of a pattern 43 formed on the irradiated surface of the glass substrate 42. The light of a predetermined wavelength was obtained through an interference filter 45 that allows for passage of this wavelength. In this example, the refractive index was measured at the wavelengths of 486 nm, 589 nm, and 658 nm. The figure also shows white light 47. The optical thickness of the glass substrate 42 at each measurement wavelength was determined by measuring the difference between two focal points respectively focused on the both surfaces, using a microscope. The diameter of the spherical glass 41 was measured by measuring the difference between two focal points respectively focused on the surface of the glass substrate 42 in contact with the spherical glass 41, and on the surface of the spherical glass on the opposite side. The refractive index of the spherical glass was determined from the distance d, the optical thickness of the glass substrate 42, and the diameter of the spherical glass 41 so obtained, using geometric optics calculations.

TABLE 3-1

| | $Ba_{(1-x)}(M2)_xTi_{y2}O_z$ | | | Diameter | Refractive index | | | |
|---|---|---|---|---|---|---|---|---|
| Sample | M2 | x | y2 | z | (mm) | 0.486 μm | 0.589 μm | 0.658 μm | Color |
| 3-1 | Ca | 0.05 | 2 | 5.000 | 1.5035 | 2.144 | 2.110 | 2.083 | Uncolored |
| 3-2 | La | 0.1 | 2 | 5.050 | 0.8955 | 2.174 | 2.132 | 2.100 | Uncolored |
| 3-3 | La | 0.10 | 2.25 | 5.550 | 0.8660 | 2.231 | 2.202 | 2.181 | Uncolored |
| 3-4 | La | 0.20 | 2.25 | 5.600 | 0.9520 | 2.189 | 2.155 | 2.141 | Uncolored |
| 3-5 | La | 0.30 | 2.25 | 5.650 | 0.9000 | 2.280 | 2.245 | 2.207 | Uncolored |
| 3-6 | La | 0.40 | 2.25 | 5.700 | 0.7455 | 2.271 | 2.258 | 2.239 | Uncolored |
| 3-7 | La | 0.50 | 2.25 | 5.750 | 0.7855 | 2.323 | 2.286 | 2.236 | Uncolored |
| 3-8 | Ce | 0.05 | 2 | 5.050 | 1.3785 | 2.177 | 2.144 | 2.118 | Red-purple |
| 3-9 | Ce | 0.10 | 2 | 5.100 | 0.9610 | 2.168 | 2.147 | 2.115 | Red-purple |
| 3-10 | Pr | 0.10 | 2 | 5.050 | 1.1775 | 2.192 | 2.159 | 2.132 | Pale yellow |
| 3-11 | Pr(0.10)/Yb(0.01) | 0.11 | 2 | 5.055 | 1.3110 | 2.204 | 2.178 | 2.157 | Pale yellow |
| 3-12 | Pr | 0.20 | 2 | 5.100 | 1.2225 | 2.254 | 2.222 | 2.195 | Yellow-green |
| 3-13 | Pr | 0.30 | 2 | 5.150 | 1.2085 | 2.237 | 2.210 | 2.185 | Yellow-green |
| 3-14 | Nd | 0.05 | 2 | 5.025 | 1.4400 | 2.156 | 2.112 | 2.098 | Pale blue |
| 3-15 | Nd | 0.30 | 2 | 5.150 | 1.0865 | 2.231 | 2.210 | 2.185 | Blue |
| 3-16 | Sm | 0.05 | 2 | 5.025 | 1.4430 | 2.181 | 2.143 | 2.127 | Uncolored |
| 3-17 | Sm | 0.30 | 2 | 5.150 | 1.1610 | 2.248 | 2.218 | 2.195 | Pale yellow |
| 3-18 | Eu | 0.05 | 2 | 5.025 | 1.8900 | 2.203 | 2.168 | 2.146 | Uncolored |
| 3-19 | Eu | 0.30 | 2 | 5.150 | 1.3445 | 2.241 | 2.191 | 2.168 | Pale yellow |
| 3-20 | Gd | 0.05 | 2 | 5.025 | 1.5455 | 2.184 | 2.143 | 2.119 | Uncolored |
| 3-21 | Gd | 0.30 | 2 | 5.150 | 1.0885 | 2.247 | 2.214 | 2.177 | Uncolored |

TABLE 3-2

| | $Ba_{(1-x)}(M2)_xTi_{y2}O_z$ | | | Diameter | Refractive index | | | |
|---|---|---|---|---|---|---|---|---|
| Sample | M2 | x | y2 | z | (mm) | 0.486 μm | 0.589 μm | 0.658 μm | Color |
| 3-22 | Tb | 0.05 | 2 | 5.025 | 1.4510 | 2.152 | 2.129 | 2.092 | Pale yellow |
| 3-23 | Tb | 0.10 | 2 | 5.050 | 1.3995 | 2.195 | 2.148 | 2.125 | Pale yellow |
| 3-24 | Tb | 0.30 | 2 | 5.150 | 1.2905 | 2.269 | 2.210 | 2.184 | Yellow |
| 3-25 | Dy | 0.05 | 2 | 5.025 | 1.3705 | 2.110 | 2.076 | 2.054 | Uncolored |
| 3-26 | Dy | 0.10 | 2 | 5.050 | 1.4120 | 2.222 | 2.180 | 2.164 | Uncolored |
| 3-27 | Dy | 0.30 | 2 | 5.150 | 1.3415 | 2.209 | 2.174 | 2.146 | Uncolored |
| 3-28 | Ho | 0.05 | 2 | 5.025 | 1.4835 | 2.121 | 2.090 | 2.071 | Pale orange |
| 3-29 | Ho | 0.10 | 2 | 5.050 | 1.5335 | 2.138 | 2.103 | 2.091 | Pale orange |
| 3-30 | Ho | 0.30 | 2 | 5.150 | 1.3955 | 2.221 | 2.188 | 2.162 | Pale orange |
| 3-31 | Er | 0.02 | 2 | 5.010 | 0.8070 | 2.173 | 2.150 | 2.136 | Pale pink |
| 3-32 | Er(0.02)/Yb(0.01) | 0.03 | 2 | 5.015 | 0.9600 | 2.221 | 2.159 | 2.143 | Pale pink |
| 3-33 | Er | 0.05 | 2 | 5.025 | 1.3360 | 2.212 | 2.175 | 2.141 | Pale pink |
| 3-34 | Er(0.05)/Yb(0.01) | 0.06 | 2 | 5.030 | 1.3915 | 2.208 | 2.154 | 2.136 | Pale pink |
| 3-35 | Er | 0.15 | 2 | 5.075 | 1.1775 | 2.227 | 2.174 | 2.149 | Pale pink |
| 3-36 | Er(0.15)/Yb(0.01) | 0.16 | 2 | 5.080 | 1.271 | 2.194 | 2.177 | 2.148 | Pale pink |
| 3-37 | Er | 0.30 | 2 | 5.150 | 1.6585 | 2.053 | 2.023 | 2.004 | Pink |
| 3-38 | Er(0.3)/Yb(0.01) | 0.31 | 2 | 5.155 | 1.3975 | 2.258 | 2.218 | 2.188 | Pink |
| 3-39 | Tm | 0.05 | 2 | 5.025 | 1.4970 | 2.156 | 2.120 | 2.097 | Uncolored |
| 3-40 | Tm | 0.30 | 2 | 5.150 | 1.3245 | 2.154 | 2.114 | 2.093 | Uncolored |
| 3-41 | Yb | 0.05 | 2 | 5.025 | 1.4780 | 2.156 | 2.123 | 2.104 | Uncolored |
| 3-42 | Yb | 0.10 | 2 | 5.050 | 1.2480 | 2.215 | 2.167 | 2.146 | Uncolored |
| 3-43 | Yb | 0.30 | 2 | 5.150 | 1.3035 | 1.943 | 1.916 | 1.898 | Uncolored |

TABLE 3-2-continued

| | | $Ba_{(1-x)}(M2)_xTi_{y2}O_z$ | | | Diameter | Refractive index | | | |
|---|---|---|---|---|---|---|---|---|---|
| Sample | M2 | x | y2 | z | (mm) | 0.486 μm | 0.589 μm | 0.658 μm | Color |
| 3-44 | Lu | 0.05 | 2 | 5.025 | 1.4315 | 2.157 | 2.114 | 2.092 | Uncolored |
| 3-45 | Lu | 0.35 | 2 | 5.175 | 1.4110 | 2.215 | 2.174 | 2.132 | Uncolored |
| 3-46 | Lu | 0.45 | 2 | 5.225 | 1.1280 | 2.297 | 2.266 | 2.244 | Uncolored |

As shown in Table 3-1 and Table 3-2, the glass samples 3-1 through 3-46 represented by the formula $Ba_{1-x}(M2)_xTi_{y2}O_z$ have refractive indices of 2.0 or more at 0.486 μm, 0.589 μm, and 0.658 μm in the visible light range, and many of the compositions have refractive indices of 2.1 or more. Further, many samples have diameters of 1 mm or more. In the tables, the samples shown with two elements under the column M2 used two Ba-substituting elements, and the values in brackets indicate the contents of the elements used. The same notation is used below.

In the titanium-containing oxide glasses of this example, the refractive index was shown to increase as the value of x was increased with an increase in mass (atomic number) of the element M2. For example, at the wavelength of 0.589 μm, the refractive index nd is 2.202, 2.245, and 2.286 in samples 3-3, 3-5, and 3-7, respectively, in which M1=Ba, M2=La, and x=0.1 (Sample 3-3), 0.3 (Sample 3-5), and 0.5 (Sample 3-7).

Considering the structure factor of the glass, the upper limit of the content x of M2 as the Ba-substituting element is related to the difference in ion radius between Ba and M2 ($r_{Ba}-r_{M2}$), and x increases as the difference becomes smaller. When the coordination number of the oxygen in the glass is eight, the difference in ion radius between Ba and the lanthanoid element has the following relationship.

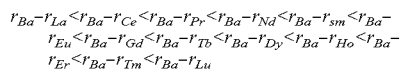

In the titanium-containing oxide glass samples of the foregoing examples, the maximum value of x for La, which has the smallest ion radius difference from Ba, is 0.5 (sample 3-7), as is the maximum value of x for Lu, which has the largest ion radius difference from Ba (sample 1-20). This suggests that the value of x for the lanthanoid elements can be as high as 0.5.

Example 4

In this example, lanthanum-titanium-containing oxide glass samples 4-1 through 4-7 represented by the formula $La_{1-x}(M2)_xTi_{y2}O_z$ (y1=0, x, y2, and z falling in the ranges noted above) were prepared. The composition of each sample is shown in Table 4. The method of preparing the glass raw material is as in Example 1. Further, the glass samples were produced by using the same apparatus and method as those used in Example 1.

Each sample, prepared as above, was measured with regard to diameter and refractive index, and the state of color was checked by visual inspection. The results are shown in Table 4.

TABLE 4

| | | $La_{(1-x)}(M2)_xTi_{y2}O_z$ | | | Diameter | Refractive index | | | |
|---|---|---|---|---|---|---|---|---|---|
| Sample | M2 | x | y2 | z | (mm) | 0.486 μm | 0.589 μm | 0.658 μm | Color |
| 4-1 | — | 0.000 | 2.25 | 6.00 | 1.5065 | 2.360 | 2.312 | 2.287 | Uncolored |
| 4-2 | Ba | 0.1 | 2.25 | 5.95 | 0.891 | 2.408 | 2.375 | 2.335 | Uncolored |
| 4-3 | Ba | 0.2 | 2 | 5.400 | 1.5675 | 2.40 | 2.34 | 2.32 | Uncolored |
| 4-4 | Ba | 0.3 | 2.25 | 5.85 | 0.9350 | 2.365 | 2.319 | 2.278 | Uncolored |
| 4-5 | Ba | 0.4 | 2.25 | 5.80 | 0.982 | 2.304 | 2.272 | 2.225 | Uncolored |
| 4-6 | Er | 0.05 | 2.25 | 6.00 | 1.1605 | 2.411 | 2.359 | 2.320 | Pale pink |
| 4-7 | Er(0.05)/Yb(0.01) | 0.06 | 2.25 | 6.00 | 1.1865 | 2.385 | 2.338 | 2.322 | Pale pink |

As shown in Table 4, the glass samples 4-1 to 4-7 represented by the formula $La_{1-x}(M2)_xTi_{y2}O_z$ have considerably high refractive indices of 2.2 or more at 0.486 μm, 0.589 μm, and 0.658 μm in the visible light range. Some of the samples have a diameter of 1 mm or more.

$La_2O_3$ has a higher refractive index (nd=2.57; see Reference) than BaO (nd=1.88; see Reference). Accordingly, the titanium-containing oxide glasses of this example, using La for M1, have higher refractive indices than the titanium-containing oxide glasses using Ba for M1. For example, the titanium-containing oxide glass sample 4-2 of the composition $La_{0.9}Ba_{0.1}Ti_{2.25}O_{5.95}$ (M1=La, M2=Ba, x=0.1, y2=2.25, z=5.95) had the highest refractive index nd=2.375 among the samples measured at the wavelength of 0.589 μm in this example.

Example 5

In this example, neodymium-titanium-containing oxide glass samples 5-1 through 5-3 represented by the formula $Nd_{1-x}(M2)_xTi_{y2}O_z$ (y1=0, x, y2, and z falling in the ranges noted above) were prepared. The composition of each sample is shown in Table 5. The method of preparing the glass raw material is as in Example 1. Further, the glass samples were produced by using the same apparatus and method as those used in Example 1.

Each sample, prepared as above, was measured with regard to diameter and refractive index, and the state of color was checked by visual inspection. The results are shown in Table 5.

TABLE 5

| Sample | $Nd_{(1-x)}(M2)_xTi_{y2}O_z$ | | | Diameter | Refractive index | | | |
|---|---|---|---|---|---|---|---|---|
| | M2 | x | y2 | z | (mm) | 0.486 μm | 0.589 μm | 0.658 μm | Color |
| 5-1 | — | 0.00 | 2.00 | 5.50 | 1.0600 | 2.349 | 2.297 | 2.271 | Purple |
| 5-2 | Er | 0.05 | 2.00 | 5.50 | 1.0485 | 2.383 | 2.356 | 2.329 | Purple |
| 5-3 | Er(0.05)/Yb(0.01) | 0.06 | 2.00 | 5.50 | 1.1120 | 2.425 | 2.388 | 2.333 | Purple |

As shown in Table 5, the glass samples 5-1 through 5-3 represented by the formula $Nd_{1-x}(M2)_xTi_{y2}O_z$ have considerably high refractive indices of 2.2 or more at 0.486 μm, 0.589 μm, and 0.658 μm in the visible light range. The diameter was 1 mm or more.

This example indicates that the use of the element Nd, heavier than Ba, for M1 further can improve the refractive index of the titanium-containing oxide glass. Specifically, the sample of the composition $Nd_{0.94}Er_{0.05}Yb_{0.01}Ti_2O_{5.5}$, containing the multiple elements Er and Yb for M2, has the highest refractive index nd=2.388 in this example.

Example 6

In this example, a lanthanum-titanium-containing oxide glass sample 6 represented by the formula $LaTi_{2.25}O_6$ (x=0, y1=0, y2=2.25, z=6) was prepared.

First, a $La_2O_3$ powder and a $TiO_2$ powder were mixed in such proportions that a glass raw material of the composition $LaTi_{2.25}O_6$ (molar ratio, $La_2O_3:TiO_2=1:4.5$) was obtained. The mixture was sintered at about 800° C. to prepare a solid, powder sinter. The sinter was placed in the gas levitation furnace 2 shown in FIG. 1, and the raw material was levitated therein by the gas pressure of the compressed air gas flowing at the flow rate adjusted by the flow-rate adjuster 4. Then, a laser beam was shone on the levitating raw material to heat and melt the material at a temperature equal to or greater than the melting point (here, 1,450° C.) of the material. The material was heated while measuring the temperature of the material with the radiation thermometer 11, and while monitoring the melting state of the material on the monitor 8 by observing the image captured by the imaging unit 7, taking into account the evaporation and the complete fusion of the material. The gas flow rate was adjusted while monitoring the levitation state of the material on the monitor 8; so as to stably levitate the raw material melt. After the raw material has melted completely, the molten state was maintained for a predetermined time period to remove bubbles formed in the raw material melt. Thereafter, the laser beam was turned off to quench and solidify the raw material melt.

Figure 25:
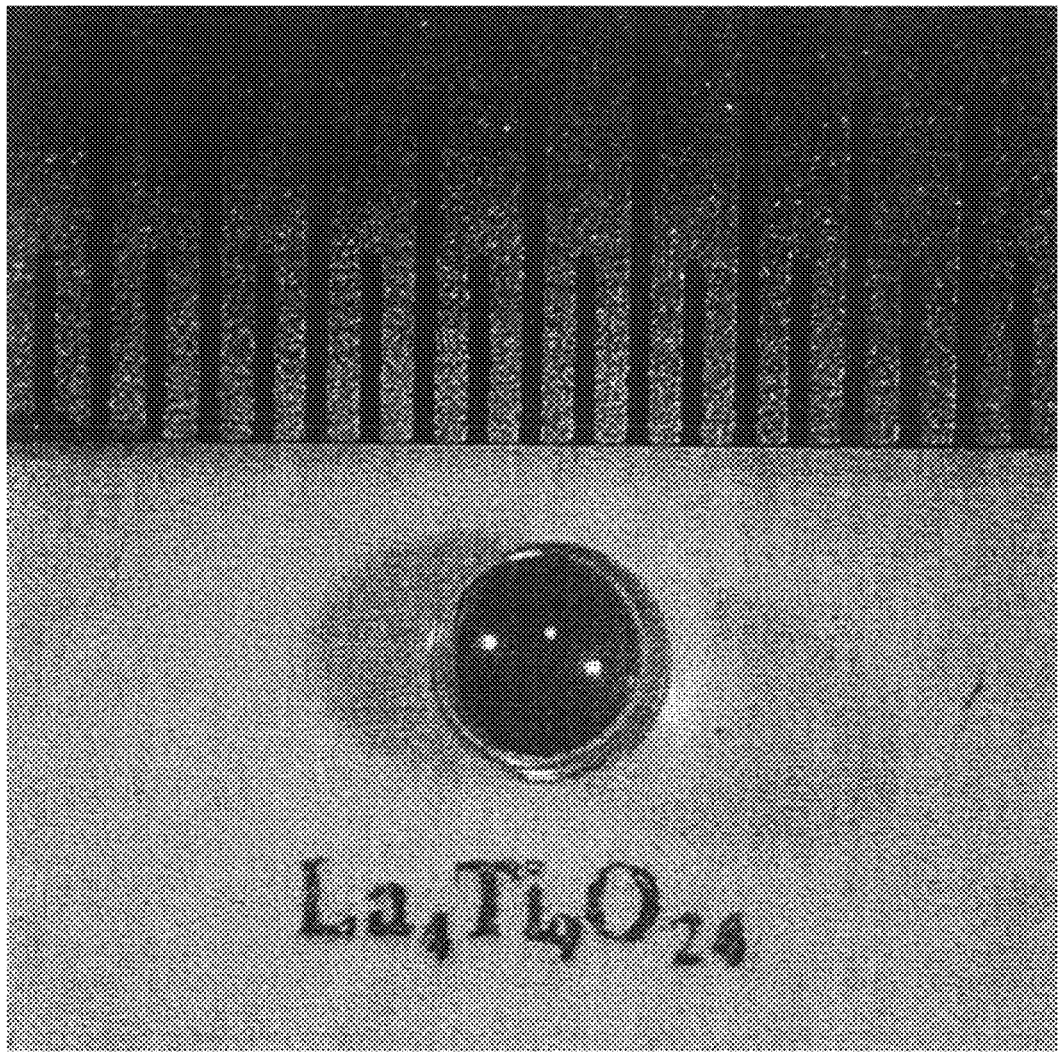
FIG. 25 is an optical micrograph of a sample prepared in Example 6.

FIG. 25 shows a optical micrograph of the resulting lanthanum-titanium-containing oxide glass. In this example, a spherical glass was obtained that had a diameter of about 2 mm, and good transparency for visible light rays, as shown in FIG. 25.

To confirm that the sample obtained in this example is a glass, the following techniques were used.

Figure 26:
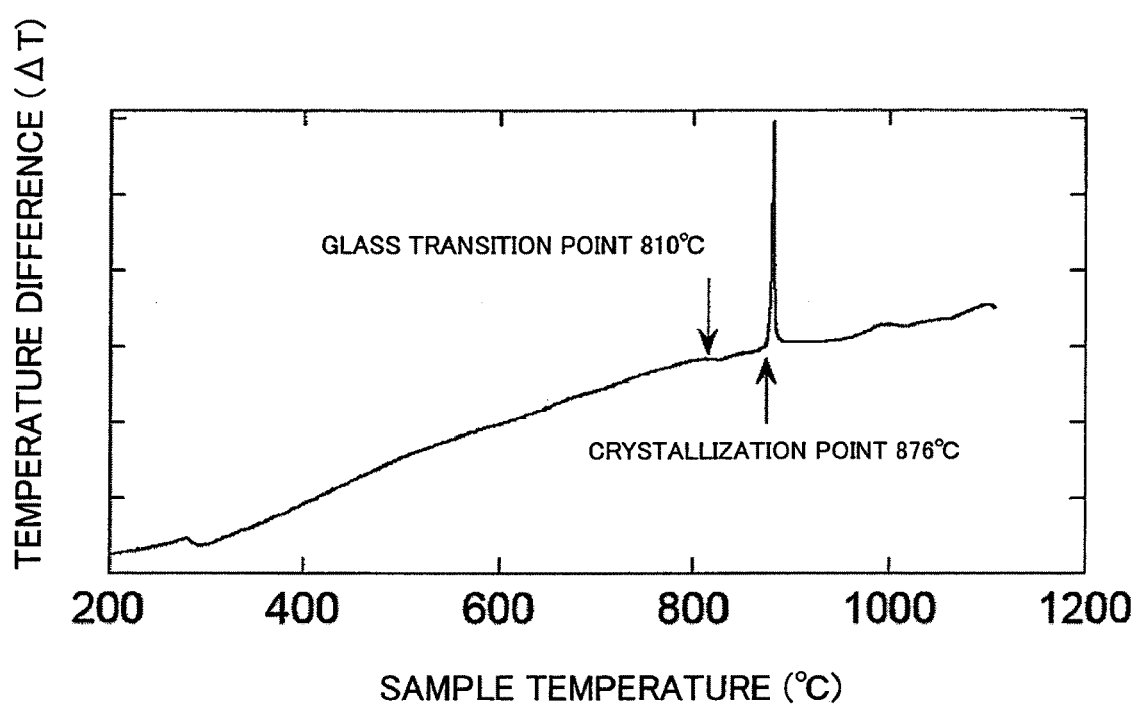
FIG. 26 is a chart representing a result of differential thermal analysis (DTA) performed on a sample prepared in Example 6.

First, the sample was measured using DTA. The result is shown in FIG. 26. It can be seen from the measurement result that the sample, on heating, exhibits a glass transition point at about 810° C., and, on further heating, makes a transition from supercooled liquid to crystal at 876° C. Thus, it can be said that the sample is in the glass state up to a temperature of about 800° C.

Figure 27A:
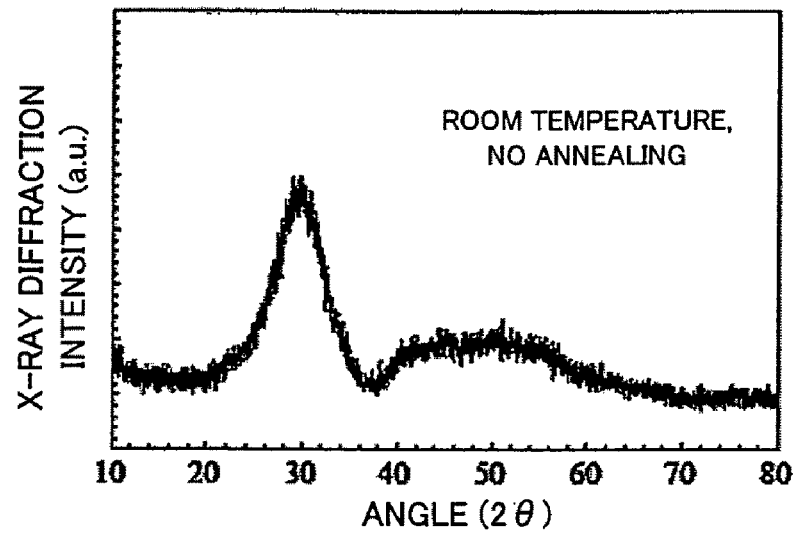
FIG. 27A is an X-ray diffraction pattern of a sample prepared in Example 6.
Figure 27B:
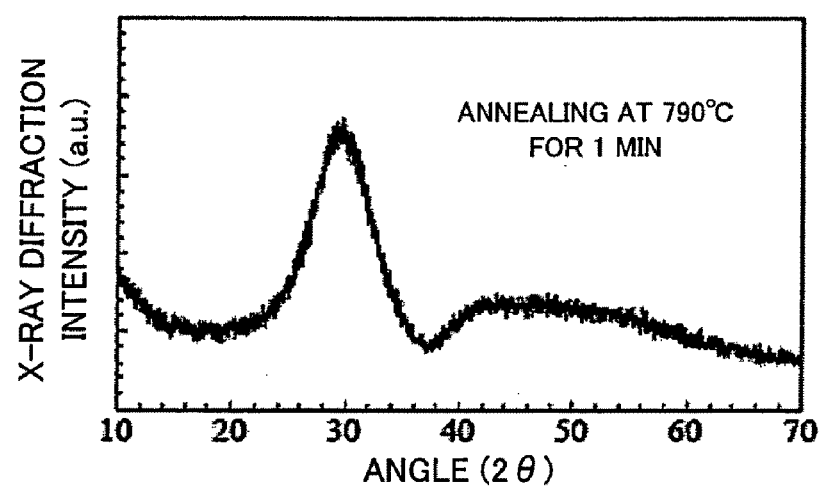
FIG. 27B is an X-ray diffraction pattern of a sample prepared in Example 6, taken after annealing at 790° C. for 1 minute.
Figure 27C:
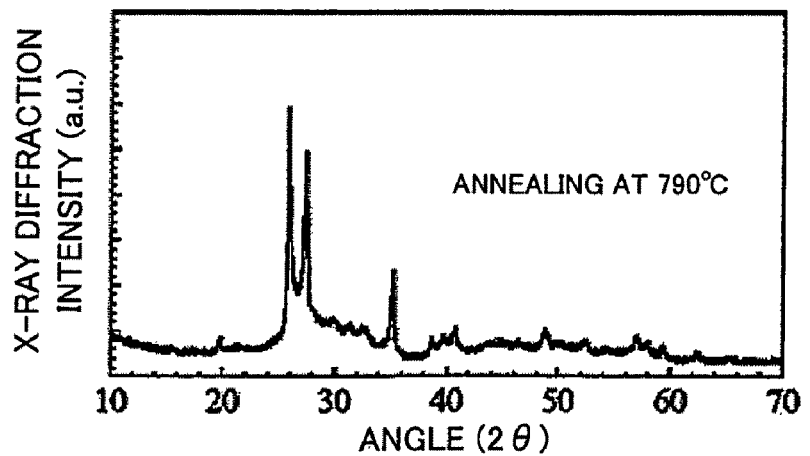
FIG. 27C is an X-ray diffraction pattern of a sample prepared in Example 6, taken after annealing at 900° C.

The X-ray diffraction pattern of the sample also was measured (A) without annealing (room temperature), (B) with annealing at 790° C. for 1 minute, and (C) with annealing at 900° C. The measurement results are shown in FIG. 27A, FIG. 27B, and FIG. 27C, respectively. As clearly shown in FIG. 27C, the sample annealed at 900° C. has a diffraction pattern with a sharp peak characteristic of the crystal, showing a transition from glass to crystal. On the other hand, the unannealed sample, as does the sample annealed at 790° C. for 1 minute (FIG. 28B), has a diffraction pattern represented by a wide curve characteristic of the glass (FIG. 27A), and no sharp peak is observed that indicates the presence of a crystal.

These results confirmed that the sample obtained in this example was indeed a glass.

The refractive index of the sample was measured at two different wavelengths (632.8 nm and 1,313 nm) at room temperature. The measurement result is shown in Table 6. In this example, the measurement of refractive index was performed using a prism coupling method, using a refractive index measurement device (Model 2010 Prism Coupler; Metricon). Measurement accuracy was ±0.001.

TABLE 6

| Wavelength (nm) | Refractive index |
|---|---|
| 1,313 | 2.223 |
| 632.8 | 2.291 |

Example 7

In this example, a lanthanum-titanium-containing oxide glass sample 7 represented by the formula $LaTi_{2.75}O_7$ (x=0, y1=0, y2=2.75, z=7) was prepared.

First, a $La_2O_3$ powder and a $TiO_2$ powder were mixed in such proportions that a glass raw material of the composition $LaTi_{2.75}O_7$ (molar ratio, $La_2O_3:TiO_2=1:5.5$) was obtained. The mixture was sintered at about 800° C. to prepare a solid, powder sinter. The sinter then was used to prepare the sample, according to the method described in Example 6. The sample was confirmed as a glass by using the same techniques described in Example 6 (DTA measurement, and X-ray diffraction pattern). The refractive index at the wavelength of 632.8 nm was 2.313, as measured according to the method of Example 6.

Example 8

In this example, a lanthanum-titanium-containing oxide glass sample 8 represented by the formula $LaTi_{3.15}Zr_{0.06}O_{7.90}$ (x=0, y1=0.019, y2=3.21, z=7.9) was prepared.

First, a $La_2O_3$ powder and a $TiO_2$ powder were mixed in such proportions that a glass raw material of the composition $LaTi_{3.15}Zr_{0.06}O_{7.90}$ (molar ratio, $La_2O_3:TiO_2:ZrO_2=0.135:0.85:0.015$) was obtained. The mixture was sintered at about 800° C. to prepare a solid, powder sinter. The sinter then was used to prepare the sample, according to the method described in Example 6. The sample was confirmed as a glass by using the same techniques described in Example 6 (DTA measurement, and X-ray diffraction pattern). The refractive index at the wavelength of 632.8 nm was 2.312, as measured according to the method of Example 6.

Example 9

In this example, lanthanum-titanium-containing oxide glass samples 9-1 through 9-22 represented by the formula $La_{1-x}(M2)_x(Ti_{1-y1}(M3)_{y1})_{y2}O_z$ were prepared. The composition of each sample is shown in Table 7 and Table 8. The method used to prepare the samples is as in Example 6. The samples were analyzed by using the same techniques (DTA, and X-ray diffraction pattern) described in Example 6. The measurements confirmed that the samples were all glass, as shown in Table 7 and Table 8. The sample diameter, and the color of each sample checked by visual inspection also are shown in Table 7 and Table 8. Samples 9-23 through 9-25 of the compositions shown in Table 9 also were prepared according to the method of Example 6. However, none of these samples vitrified.

TABLE 7

| | Sample | | | | | |
|---|---|---|---|---|---|---|
| | 9-1 | 9-2 | 9-3 | 9-4 | 9-5 | 9-6 |
| $TiO_2$ | 57 | 80 | 82 | 82 | 82 | 82 |
| $La_2O_3$ | 18 | 20 | 18 | 14.5 | 17.1 | 17.1 |
| $Lu_2O_3$ | — | — | — | — | 0.9 | — |
| $Yb_2O_3$ | — | — | — | — | — | 0.9 |
| $Gd_2O_3$ | — | — | — | — | — | — |
| $Eu_2O_3$ | — | — | — | — | — | — |
| $Nd_2O_3$ | — | — | — | — | — | — |
| $Ga_2O_3$ | — | — | — | — | — | — |
| $Al_2O_3$ | — | — | — | — | — | — |
| $Fe_2O_3$ | — | — | — | — | — | — |
| BaO | — | — | — | 3.5 | — | — |
| $ZrO_2$ | 25 | — | — | — | — | — |
| $(La)_{1-x}(M2)_x(Ti_{1-y1}(M3)_{y1})_{y2}O_z$ | | | | | | |
| M2 | — | — | — | Ba | Lu | Yb |
| M3 | Zr | — | — | — | — | — |
| x | 0 | 0 | 0 | 0.12 | 0.05 | 0.05 |
| y1 | 0.3 | 0 | 0 | 0 | 0 | 0 |
| y2 | 2.27 | 2 | 2.278 | 2.523 | 2.278 | 2.278 |
| z | 6.055 | 5.5 | 6.056 | 6.466 | 6.056 | 6.056 |
| Vitrification | ○ | ○ | ○ | ○ | ○ | ○ |
| Evaluation (diameter, color) | 2 mm or more, transparent | 2 mm, opaque white | 2 mm or more, transparent | 2 mm or more, transparent | 2 mm or more, transparent | 2 mm or more, transparent |

| | Sample | | | | |
|---|---|---|---|---|---|
| | 9-7 | 9-8 | 9-9 | 9-10 | 9-11 |
| $TiO_2$ | 82 | 82 | 82 | 82 | 82 |
| $La_2O_3$ | 17.1 | 17.1 | 17.1 | 17.1 | 17.1 |
| $Lu_2O_3$ | — | — | — | — | — |
| $Yb_2O_3$ | — | — | — | — | — |
| $Gd_2O_3$ | 0.9 | — | — | — | — |
| $Eu_2O_3$ | — | 0.9 | — | — | — |
| $Nd_2O_3$ | — | — | 0.9 | — | — |
| $Ga_2O_3$ | — | — | — | 0.9 | — |
| $Al_2O_3$ | — | — | — | — | — |
| $Fe_2O_3$ | — | — | — | — | 0.9 |
| BaO | — | — | — | — | — |
| $ZrO_2$ | — | — | — | — | — |
| $(La)_{1-x}(M2)_x(Ti_{1-y1}(M3)_{y1})_{y2}O_z$ | | | | | |
| M2 | Gd | Eu | Nd | Ga | — |
| M3 | — | — | — | — | Fe |
| x | 0.05 | 0.05 | 0.05 | 0.05 | 0 |
| y1 | 0 | 0 | 0 | 0 | 0.021 |
| y2 | 2.278 | 2.278 | 2.278 | 2.278 | 2.458 |
| z | 6.056 | 6.056 | 6.056 | 6.056 | 6.374 |
| Vitrification | ○ | ○ | ○ | ○ | ○ |
| Evaluation (diameter, color) | 2 mm or more, transparent | 2 mm or more, transparent | 2 mm or more, pink | 2 mm or more, blue | 2 mm or more, black |

TABLE 8

| | Sample | | | | | |
|---|---|---|---|---|---|---|
| | 9-12 | 9-13 | 9-14 | 9-15 | 9-16 | 9-17 |
| $TiO_2$ | 85 | 85 | 85 | 85 | 85 | 85 |
| $La_2O_3$ | 15 | 12 | 12 | 12 | 13.5 | 13.5 |
| $Lu_2O_3$ | — | 3 | — | — | — | — |
| $Yb_2O_3$ | — | — | 3 | — | — | — |
| $Gd_2O_3$ | — | — | — | 3 | — | — |
| $Al_2O_3$ | — | — | — | — | 1.5 | — |
| $Fe_2O_3$ | — | — | — | — | — | — |
| MgO | — | — | — | — | — | 1.5 |
| CaO | — | — | — | — | — | — |
| SrO | — | — | — | — | — | — |
| BaO | — | — | — | — | — | — |
| $ZrO_2$ | — | — | — | — | — | — |
| $(La)_{1-x}(M2)_x(Ti_{1-y1}(M3)_{y1})_{y2}O_z$ | | | | | | |
| M2 | — | Lu | Yb | Gd | Al | Mg |
| M3 | — | — | — | — | — | — |
| x | 0 | 0.25 | 0.25 | 0.25 | 0.11 | 0.06 |
| y1 | 0 | 0 | 0 | 0 | 0 | 0 |
| y2 | 2.833 | 2.833 | 2.833 | 2.833 | 2.833 | 2.982 |
| z | 7.167 | 7.167 | 7.167 | 7.167 | 7.167 | 7.439 |
| Vitrification | ○ | ○ | ○ | ○ | ○ | ○ |
| Evaluation (diameter, color) | 2 mm or more, transparent | 2 mm or more, transparent | 2 mm or more, transparent | 2 mm or more, transparent | approx. 1 mm, transparent | approx. 1 mm, transparent |

| | Sample | | | | |
|---|---|---|---|---|---|
| | 9-18 | 9-19 | 9-20 | 9-21 | 9-22 |
| $TiO_2$ | 85 | 85 | 85 | 85 | 86 |
| $La_2O_3$ | 13.5 | 13.5 | 13.5 | 13.5 | 14 |
| $Lu_2O_3$ | — | — | — | — | — |
| $Yb_2O_3$ | — | — | — | — | — |
| $Gd_2O_3$ | — | — | — | — | — |
| $Al_2O_3$ | — | — | — | — | — |
| $Fe_2O_3$ | — | — | — | — | — |
| MgO | — | — | — | — | — |
| CaO | 1.5 | — | — | — | — |
| SrO | — | 1.5 | — | — | — |
| BaO | — | — | 1.5 | — | — |
| $ZrO_2$ | — | — | — | 1.5 | — |
| $(La)_{1-x}(M2)_x(Ti_{1-y1}(M3)_{y1})_{y2}O_z$ | | | | | |
| M2 | Ca | Sr | Ba | — | — |
| M3 | — | — | — | Zr | — |
| x | 0.06 | 0.06 | 0.06 | 0 | 0 |
| y1 | 0 | 0 | 0 | 0.018 | 0 |
| y2 | 2.982 | 2.982 | 2.982 | 3.2 | 3.071 |
| z | 7.439 | 7.439 | 7.439 | 7.907 | 7.643 |
| Vitrification | ○ | ○ | ○ | ○ | ○ |
| Evaluation (diameter, color) | approx. 1 mm, transparent | approx. 1 mm, transparent | approx. 1 mm, transparent | 2 mm or more, transparent | approx. 1 mm, transparent |

TABLE 9

| Sample | 9-23 | 9-24 | 9-25 |
|---|---|---|---|
| $TiO_2$ | 87.5 | 87.5 | 85 |
| $La_2O_3$ | 8.75 | 11.25 | 12 |
| $Lu_2O_3$ | 3.75 | — | — |
| $Yb_2O_3$ | — | 1.25 | — |
| $Sc_2O_3$ | — | — | — |
| $Y_2O_3$ | — | — | — |
| $Ga_2O_3$ | — | — | — |
| $ZrO_2$ | — | — | 3 |
| $Nb_2O_5$ | — | — | — |
| SuO | — | — | — |
| $(La)_{1-x}(M2)_x(Ti_{1-y1}(M3)_{y1})_{y2}O_z$ | | | |
| M2 | Lu | Yb | — |
| M3 | — | — | Zr |
| x | 0.17 | 0.13 | 0 |
| y1 | 0 | 0 | 0.017 |
| y2 | 4.268 | 3.431 | 3.6 |
| z | 8.5 | 8.5 | 8.833 |
| Vitrification | x | x | x |
| Evaluation | — | — | — |

The results shown in Table 7 and Table 8 confirmed that the vitrification of the lanthanum-titanium-containing oxide glass is possible even when the titanium in the composition is partly substituted with other elements (M3), and when the lanthanum in the composition is partly substituted with other elements (M2).

The results shown in Table 9 confirmed that vitrification is difficult when the sum of the Ti content and the content of the Ti-substituting element (M3) in the composition is too large.

Example 10

Figure 28A:
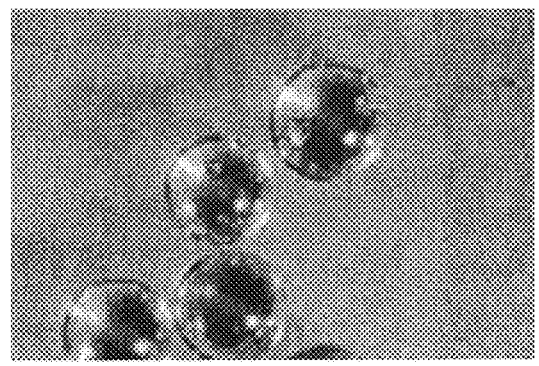
FIG. 28A is an optical micrograph of a sample prepared in Example 10.
Figure 28B:
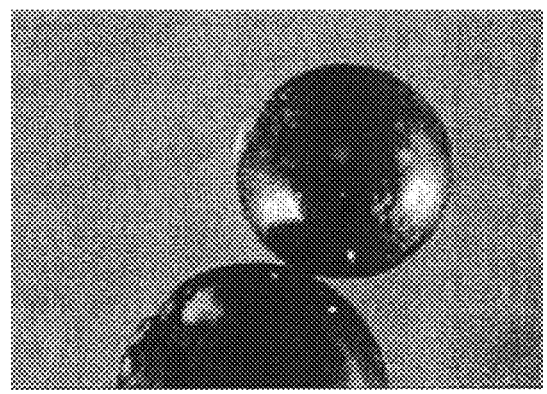
FIG. 28B is an optical micrograph of a sample prepared in Example 10.
Figure 28C:
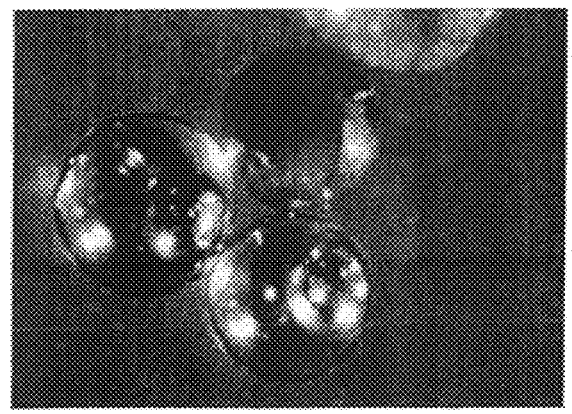
FIG. 28C is an optical micrograph of a sample prepared in Example 10.

In this example, titanium-containing oxide glass samples represented by the formulae $SmTi_{2.25}O_6$ (x=0, y1=0, y2=2.25, z=6), $CeTi_{2.25}O_{6.5}$ (x=0; y1=0, y2=2.25, z=6.5), $PrTi_{2.25}O_{6.3}$ (x=0, y1=0, y2=2.25, z=6.3) were prepared according to the method of Example 6. FIG. 28A, FIG. 28B, and FIG. 28C show optical micrographs of the titanium-containing oxide glasses. As shown in FIG. 28A, FIG. 28B, and FIG. 28C, vitrification also was possible with the compositions of this example. The glass of the composition $SmTi_{2.25}O_6$ shown in FIG. 28A was pale green in color, and had a diameter of 1 mm or less. The glass of the composition $CeTi_{2.25}O_{6.5}$ shown in FIG. 28B was black in color, and had a diameter of 1 mm or less. The glass of the composition $PrTi_{2.25}O_{6.3}$ shown in FIG. 28C was green in color, and had a diameter of 1 mm or less.

INDUSTRIAL APPLICABILITY

The present invention provides a titanium-containing oxide glass and a method for production thereof that can produce a conventionally unavailable bulk glass having a high refractive index in the visible light range. Further, with a producing method of the present invention, a bulk glass having a high refractive index can be produced conveniently in a short time period. The present invention is therefore suitable for optical parts such as a lens.

The invention claimed is:

1. A titanium-containing oxide glass in a spherical shape essentially having a composition represented by the formula:

$(M1)_{1-x}(M2)_x(Ti_{1-y1}(M3)_{y1})_{y2}O_z$, wherein M1 is one element selected from the group consisting of Ba, La, Ce, Pr, Nd, Sm, Eu, Gd, Tb, Dy, Ho, Er, Tm, Yb, Lu, Na, and Ca, M2 is at least one element selected from the group consisting of Mg, Ba, Ca, Sr, La, Ce, Pr, Nd, Sm, Eu, Gd, Tb, Dy, Ho, Er, Tm, Yb, Lu, Na, Sc, Y, Hf, Bi, and Ag, M3 is at least one element selected from the group consisting of V, Cr, Mn, Fe, Co, Ni, Cu, Zn, Zr, Nb, Mo, Ru, Rh, Pd, Al, Si, P, Ga, Ge, In, Sn, Sb, and Te, and x, y1, y2, and z satisfy:

$0 \leq x \leq 0.5$, $0 \leq y1 < 0.31$, $1.4 < y2 < 2.3$, $3.9 < z < 8.0$, $x+y1 \neq 0$ when M1 is Ba, and $y1 \neq 0$ when M1 and M2 are Ba, and wherein the glass in the spherical shape has a minimum diameter for the spherical shape of 0.5 mm or more.

2. The titanium-containing oxide glass according to claim 1, wherein M1 is one element selected from the group consisting of Ba, La, Ce, Pr, Nd, Sm, and Ca.

3. The titanium-containing oxide glass according to claim 2, wherein M1 is one element selected from the group consisting of Ba, La, Nd, and Ca.

4. The titanium-containing oxide glass according to claim 1, wherein M1 is Ba, and
wherein x, y1, y2, and z satisfy:

$0 \leq x \leq 0.5$, $0 \leq y1 < 0.05$, $1.4 < y2 < 2.3$, $3.9 < z < 6.5$, $x+y1 \neq 0$, and $y1 \neq 0$ when M2 is Ba.

5. The titanium-containing oxide glass according to claim 1, wherein M1 is Ba,
wherein M2 is at least one element selected from the group consisting of La, Ce, Pr, Nd, Sm, Eu, Gd, Tb, Dy, Ho, Er, Tm, Yb, and Lu, and
wherein x, y1, y2, and z satisfy:

$0 \leq x \leq 0.5$, $0 \leq y1 < 0.05$, $1.4 < y2 < 2.3$, $3.9 < z < 6.5$, and $x+y1 \neq 0$.

6. The titanium-containing oxide glass according to claim 1, wherein M1 is La, and wherein M3 is Zr.

7. The titanium-containing oxide glass according to claim 1, wherein the glass has a refractive index of 2.0 or more in a visible light range.

8. The titanium-containing oxide glass according to claim 1, wherein the glass is a sphere having a minimum diameter of 1.0 mm or more.

* * * * *